(12) United States Patent
Bengough et al.

(10) Patent No.: US 11,032,190 B2
(45) Date of Patent: Jun. 8, 2021

(54) METHODS AND SYSTEMS FOR NETWORK SECURITY UNIVERSAL CONTROL POINT

(71) Applicant: CORSA TECHNOLOGY INC., Ottawa (CA)

(72) Inventors: Peter Bengough, Kanata (CA); Yuri Kolomiyets, Ottawa (CA); Carolyn Raab, Chelsea (CA); Stuart Reid, Kanata (CA); Jonathan Sewter, Kanata (CA); Stacey Sheldon, Ottawa (CA)

(73) Assignee: CORSA TECHNOLOGY INC.

( * ) Notice: Subject to any disclaimer, the term of this patent is extended or adjusted under 35 U.S.C. 154(b) by 137 days.

(21) Appl. No.: 16/129,125

(22) Filed: Sep. 12, 2018

(65) Prior Publication Data
US 2020/0084141 A1 Mar. 12, 2020

(51) Int. Cl.
| | |
|---|---|
| *H04L 12/725* | (2013.01) |
| *H04L 12/851* | (2013.01) |
| *H04L 12/743* | (2013.01) |
| *H04L 12/933* | (2013.01) |
| *H04L 12/931* | (2013.01) |
| *H04L 12/803* | (2013.01) |
| *H04L 29/06* | (2006.01) |

(52) U.S. Cl.
CPC ........ *H04L 45/306* (2013.01); *H04L 45/7453* (2013.01); *H04L 47/125* (2013.01); *H04L 47/2441* (2013.01); *H04L 47/2483* (2013.01); *H04L 49/1546* (2013.01); *H04L 49/354* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2014/0108632 A1* | 4/2014 | Narasimha | H04L 45/38 709/223 |
| 2014/0334295 A1* | 11/2014 | Guichard | H04L 47/2441 370/230 |
| 2017/0317932 A1* | 11/2017 | Paramasivam | H04L 47/125 |
| 2018/0054475 A1* | 2/2018 | Agarwal | H04L 67/42 |
| 2018/0063018 A1* | 3/2018 | Bosch | H04L 45/306 |
| 2018/0176128 A1* | 6/2018 | Sharma | H04L 41/0886 |
| 2019/0081894 A1* | 3/2019 | Yousaf | H04L 45/745 |

\* cited by examiner

*Primary Examiner* — Jeffrey M Rutkowski
*Assistant Examiner* — Basil Ma
(74) *Attorney, Agent, or Firm* — Barnes & Thornburg, LLP

(57) ABSTRACT

The present disclosure relates to handling of packet flows between a pair of network security zones in a communications network. A packet that is sent from one of the network security zones toward the other of the network security zones is directed to a packet processing service chain, based on a packet handling classification of a packet flow of which the packet is a part. The service chain has multiple identical service chain instances to perform a service on packets, and the packet is directed to one of the service chain instances within the service chain. A packet that is processed by any of the service chain instances is transmitted to the other network security zone.

73 Claims, 9 Drawing Sheets

301

| 16 BIT HASH VALUE | SERVICE CHAIN INSTANCE |
|---|---|
| 00 | 1 |
| 01 | 2 |
| 02 | 3 |
| 03 | 4 |
| 04 | 5 |
| 05 | 6 |
| 06 | 7 |
| 07 | 1 |
| 10 | 2 |
| 11 | 3 |
| 12 | 4 |
| 13 | 5 |
| 14 | 6 |
| 15 | 7 |
| 16 | 1 |
| 17 | 2 |
| 20 | 3 |
| ... | ... |
| 177777 | 2 |

FIG. 3A

METHODS AND SYSTEMS FOR NETWORK SECURITY UNIVERSAL CONTROL POINT

TECHNICAL FIELD

Embodiments herein generally relate to the field of communications networks and more specifically to the handling of data packets to enhance the security of communications networks.

DESCRIPTION OF RELATED ART

A network firewall is a security system that enforces security based access control policies on a communications network. A firewall could establish a barrier to malicious traffic between a trusted network such as a private corporate network and another untrusted network, such as the Internet, for example. Many firewalls are proprietary, closed systems which run on dedicated hardware. These systems could have limited configurability and customization options and might not easily interact with third party systems. Malicious attacks are growing in sophistication and scale and more flexible network security solutions could be beneficial.

SUMMARY

A more flexible security solution could comprise a Universal Control Point (UCP) with any one or more of the following features:
- visibility—the ability to export packet and packet flow statistics and copies of selected packets to third party analytic or intrusion detection systems
- in-line service chaining—the ability to redirect any subset of traffic to third party service chains providing different network functions
- load balancing—the ability to balance the loading of multiple, parallel instances of a service chain
- machine to machine communication—the ability of the UCP to communicate with and receive security rules from third party analytic or intrusion detection systems
- enforcement—the ability to enforce internally or externally derived security rules on packet traffic including accepting, dropping, rate limiting, copying, or redirecting packets to a service chain.

According to one aspect of the present disclosure, a system for handling packet flows between a pair of network security zones in a communications network is provided. The system includes a receiver to receive a packet that is sent from one of the network security zones toward the other of the network security zones; an enforcement module, coupled to the receiver, to direct the packet to a packet processing service chain based on a packet handling classification of a packet flow of which the packet is a part; and a transmitter, coupled to the enforcement module, to transmit a packet processed by any of the service chain instances to the other network security zone. The service chain has a plurality of identical service chain instances to perform a service on packets, and the enforcement module is configured to direct the packet to one of the service chain instances within the service chain.

Also provided is a method for handling packet flows between a pair of network security zones in a communications network. The method involves receiving a packet that is sent from one of the network security zones toward the other of the network security zones; directing the packet to a packet processing service chain based on a packet handling classification of a packet flow of which the packet is a part, wherein the service chain has a plurality of identical service chain instances to perform a service on packets, wherein the directing further comprises directing the packet to one of the service chain instances within the service chain; and transmitting a packet processed by any of the service chain instances to the other network security zone.

Another aspect relates to a non-transitory processor-readable storage medium storing instructions which, when executed by a processor, cause the processor to perform a method for handling packet flows between a pair of network security zones in a communications network. The method, as described above, involves receiving a packet that is sent from one of the network security zones toward the other of the network security zones; directing the packet to a packet processing service chain based on a packet handling classification of a packet flow of which the packet is a part, wherein the service chain has a plurality of identical service chain instances to perform a service on packets, wherein the directing further comprises directing the packet to one of the service chain instances within the service chain; and transmitting a packet processed by any of the service chain instances to the other network security zone.

BRIEF DESCRIPTION OF THE DRAWINGS

Embodiments herein will be better understood from the following detailed description with reference to the drawings, in which:

FIG. 3A is a diagram of an example service chain instance distribution look-up table.

DETAILED DESCRIPTION

Communication traffic can take any of various forms and include any of various types of information. Data flows and data packets as referenced herein are examples of communication traffic to which the embodiments disclosed herein could be applied. The present disclosure is not necessarily limited to transfer of data, or to data or information that is specifically formatted into packets. Features that are disclosed herein with reference to data flows or data traffic could be applied to communication traffic other than data flows, to communication traffic that is formatted into blocks other than packets, and/or to communication traffic that includes content or payloads other than strictly data.

A packet "flow" is a unidirectional movement of data packets with a set of common characteristics. A set of common characteristics could be, for example, the packet's Internet Protocol (IP) source and destination addresses, its IP protocol, its source and destination port addresses and its IP class of service. A subset of one or more of these characteristics, and/or other characteristics of packets, could be used to define a packet flow. The common characteristics which define a flow is also called the flow key.

Data packets are organized according to well-known protocols such as, for example, the Transmission Control Protocol (TCP). A data packet is typically organized into a header and a payload. The header contains information about the data packet such as its source and destination addresses. The payload is the actual data to be transferred.

Figure 1A:
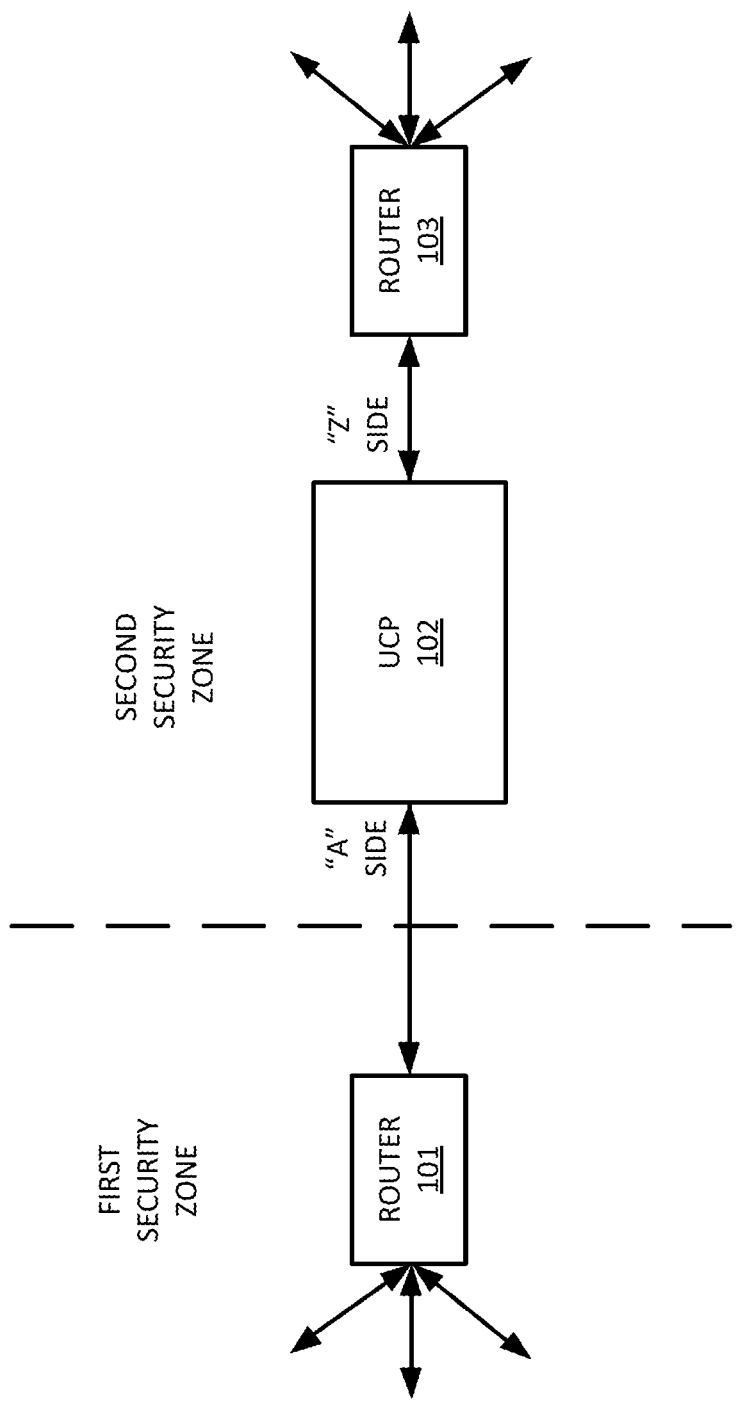
FIG. 1A is a block diagram depicting an example placement of a Universal Control Point (UCP) in a communications network.

FIG. 1A is a block diagram depicting an example placement of a Universal Control Point (UCP) in a communications network. UCP 102 is positioned between packet routers 101 and 103 and all packet traffic between routers 101 and 103 passes through UCP 102. Router 101 is in a first security zone and router 102 is in a second security zone. A security zone is a collection of networked hosts (e.g. servers, user workstations) with a common set of access security policies.

In one embodiment, router 103 is a gateway router placed at the perimeter of a private network such as a Local Area Network (LAN) and router 101 is a router on a different network, such as the Internet. In this embodiment the UCP 102 protects the private network from attacks from the Internet.

FIG. 1A is an example only and other placements of a UCP are possible. For example, routers 101 and 103 could both be inside a corporate network. Router 101 could be inside one corporate security zone and router 103 could be inside a different corporate security zone. In this case the UCP could protect each security zone from attacks originating in the other security zone. Other types of devices instead of a router on either side of the UCP are possible. For example, an ethernet switch or a PC (Personal Computer) could be provided instead of either or both of the routers 101 and 103.

In general, UCP 102 is placed at a boundary between two different security zones to mitigate attacks on one security zone from the other security zone. UCP 102 is bi-directional. A packet can enter UCP 102 at its "A" side from router 101 and exit from the UCP's "Z" side to router 103. A packet can also enter UCP 102 at its "Z" side from router 103 and exit from the "A" side to router 101. Packets can never, however, enter and exit from the same side (e.g. enter and exit UCP 102 at its "A" side).

UCP "sides" referenced herein are intended solely to refer to logical rather than physical sides of the UCP and illustrate different directions of packet flow. For example, a port or other type of interface to receive or transmit packet traffic need not be located at a physical side of a UCP. Also, "A" side and "Z" side traffic could be received by physically adjacent receive ports or interfaces that are not located at different physical sides of a UCP, or even by a single physical port or interface that receives incoming traffic for both "A" to "Z" and "Z" to "A" traffic flow directions. Similarly, "A" side and "Z" side transmit ports or interfaces need not be located at physically different sides of a UCP, or a single transmit port or interface could be used to transmit outgoing "A" side and "Z" side traffic from a UCP.

An important property of UCP 102 is that it is in effect "transparent" to routers 101 and 103 at the level 2 data link layer of the OSI (Open Systems Interconnect) model. Packets traveling between router 101 and router 103 through UCP 102 do not require either the MAC (Media Access Control) address or IP (Internet Protocol) address of UCP 102 for routing purposes. UCP 102 could be inserted into the network without requiring changes to routers 101 or 103 or to their routing protocol. UCP 102 does not participate directly in any OSI layer 2 or OSI layer 3 protocols. For example, packets received at one of two ports in a two-port UCP implementation are processed and, unless dropped by the UCP, are transmitted out the other of its two ports. This feature could allow the UCP's operation and enforcement of access security to be done independently from the network's communication infrastructure.

UCP 102 could be designed to process packets at a rate equal to or greater than the maximum transmission rate between router 101 and 103 (known as the "line rate"). For example, if the communication path between router 101 and 103 is a 100 Gigabit (Gb) per second (Gbps) line then UCP 102 could be designed with enough processing power to process packets at a rate up to at least 100 Gbps. This property of line rate processing means that the placement of UCP 102 does not cause an unintentional reduction in the data transmission rate between routers 101 and 103.

Figure 1B:
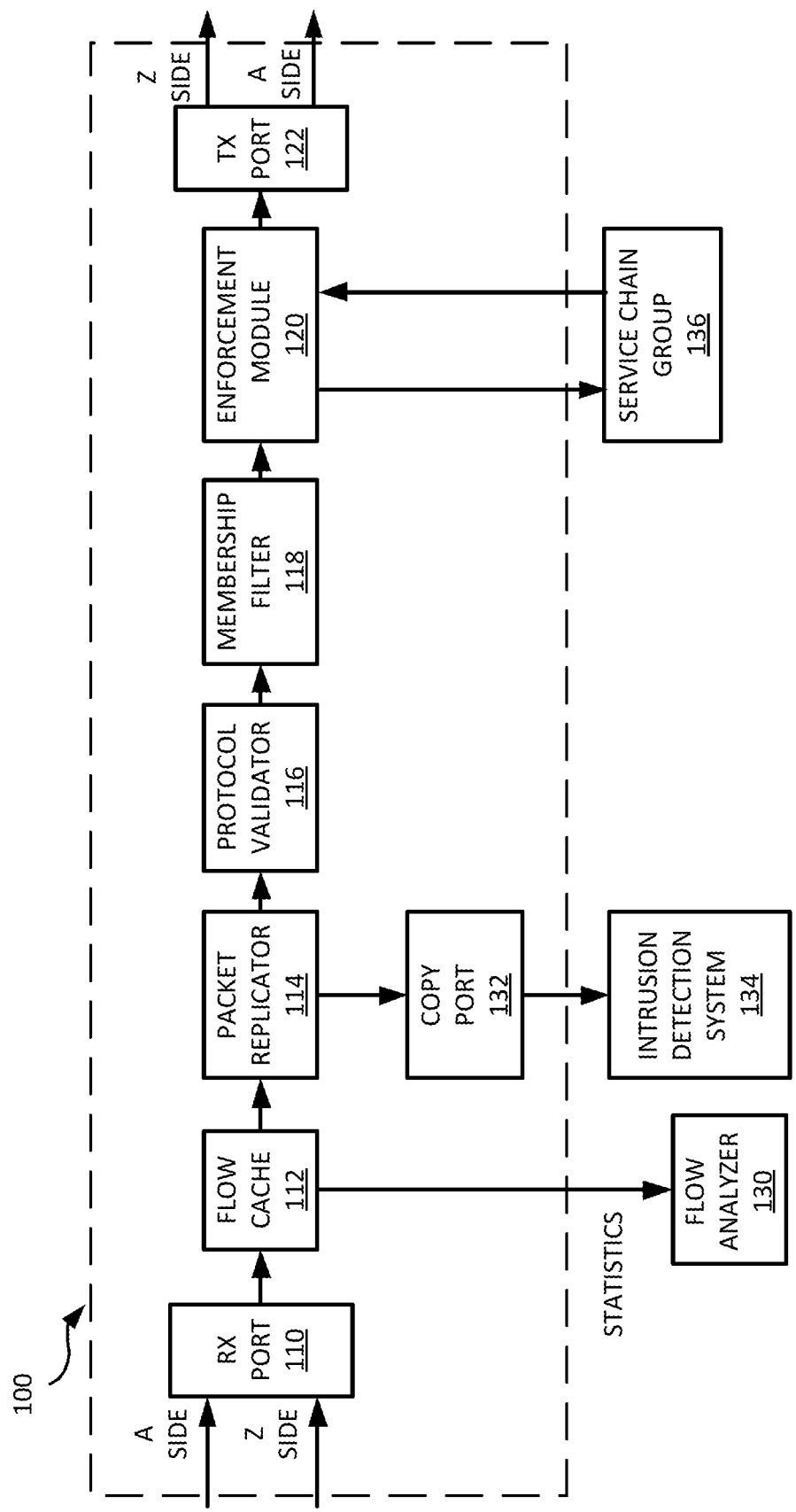
FIG. 1B is a block diagram of an example UCP.

FIG. 1B is a block diagram of an example UCP. UCP 100 comprises receive (RX) port 110, transmit (TX) port 122, copy port 132, flow cache 112, packet replicator 114, protocol validator 116, membership filter 118, and enforcement module 120.

The ports, including RX port 110, TX port 122, and copy port 132 represent interfaces through which the UCP 100 can exchange traffic and/or other information with external components. The particular structure of each port may vary depending on characteristics such as the communications medium/media or connection(s) over which traffic or information are to be exchanged with external components and/or the communication or transfer protocol(s) to be supported, for example. Neither RX port 110 nor TX port 122 is assigned a MAC address or an IP address and therefore RX port 110 performs no address-based filtering and TX port 122 makes no modifications to the outgoing addresses.

Flow cache 112, packet replicator 114, protocol validator 116, membership filter 118, and enforcement module 120 could be implemented using a combination of digital logic and memory, for example.

In one embodiment flow cache 112 is implemented using custom logic in a Field Programmable Gate Array (FPGA) that is coupled to a database stored in an off chip serial memory device; packet replicator 114 is implemented using custom logic in an FPGA and an off-chip switch ASIC (Application Specific Integrated Circuit); protocol validator 116 is implemented in an FPGA, using custom logic; membership filter 118 is implemented using custom logic in an FPGA coupled to a database stored in off-chip Dynamic Random Access Memory (DRAM) and enforcement module 120 is implemented using custom logic in an FPGA that is coupled to a database stored in an external network search Application Specific Integrated Circuit (ASIC). In one embodiment, flow cache 112, packet replicator 114, protocol validator 116, membership filter 118 and enforcement module 120 are all implemented in the same FPGA. This could desirably increase the speed of operation of UCP 100 and/or decrease its power consumption. In another embodiment flow cache 112, packet replicator 114, protocol validator 116, membership filter 118 and enforcement module 120 are all implemented in a pair of FPGAs wherein both FPGAs perform the same functions in parallel, which could effectively double the packet processing throughput of UCP 100. In another embodiment, one FPGA handles packet processing in the "A" to "Z" direction and the other FPGA handles packet processing in the "Z" to "A" direction.

UCP 100 is bi-directional. RX port 110 can receive data packets from the "A" side and the "Z" side of UCP 100. TX port 122 transmits processed packets originally received at the UCP's "A" side from the UCP's "Z" side and transmits processed packets originally received at the UCP's "Z" side from the UCP's "A" side.

RX port 110 passes received packets to flow cache 112. RX port 110 could mark received packets with their direction ("A" to "Z" or "Z" to "A") or which side they were received at ("A" or "Z") before passing them to flow cache 112.

Flow cache 112 characterizes the packets and packet flows passing through it. Flow cache 112 optionally stores information about the packets and packet flows. Flow cache 112 could also append a flow identifier to each packet to identify the flow to which the packet belongs. The packet could then be forwarded to packet replicator 114. The flow identifier could be removed from the packet before it leaves the UCP 100, by enforcement engine 120 for example.

A flow identifier could be created in any of various ways. For example, flow cache 112 could create a digital "fingerprint" based on the combination of packet characteristics which define a packet flow. The combination of packet characteristics which define a packet flow is often referred to as the "flow key". For a packet using the TCP protocol the flow key could be, for example, the combination of the packet's IP source and destination addresses, the packet's protocol and the packet's source and destination port numbers.

A digital fingerprint could be created from a transformation (such as a mathematical "hash") of the packet characteristics chosen to define a flow. Any of various types of hashing algorithm, and/or other algorithms that transform input information into a hash, digest, or other fingerprint that is practically unique for different sets of input information, could be used. Cyclical Redundancy Checking (CRC), MD-5 and SHA-1 are examples. In one embodiment the fingerprint is a 64-bit number. The length of the fingerprint could be chosen to reduce the probability that two different packet flows generate the same fingerprint (a "collision") to an acceptably low value.

The fingerprint could be the flow identifier and flow cache 112 could append the packet's fingerprint to the packet and forward the packet to packet replicator 114.

Flow cache 112 could also or instead maintain a flow database comprising fingerprint hash values and their corresponding flow identifiers. The flow database could be stored in internal memory in the flow cache 112 or external memory, implemented using one or more storage devices. When flow cache 112 receives a packet, it could calculate its fingerprint hash and query the flow database for the presence of the fingerprint. If the fingerprint is found, then the flow database could return the corresponding flow identifier that is stored with or otherwise associated with the fingerprint in the database. The flow identifier could be allocated from a smaller number space than the fingerprint hash. For example, the fingerprint hash could be a 64-bit number and the flow identifier could be a 21-bit number. Flow identifiers could be sequential and thus a 21-bit flow identifier could be used to identify $2^{21}$ (2M) individual flows. Flow cache 112 could append a packet's flow identifier to the packet and forward the packet to packet replicator 114.

If a packet's fingerprint is not found in the flow database by flow cache 112, then this could indicate that the packet's flow is not currently being tracked and that the packet represents the first packet in a new flow. The fingerprint could be inserted into the flow database and a new flow identifier allocated to it.

Figure 1C:
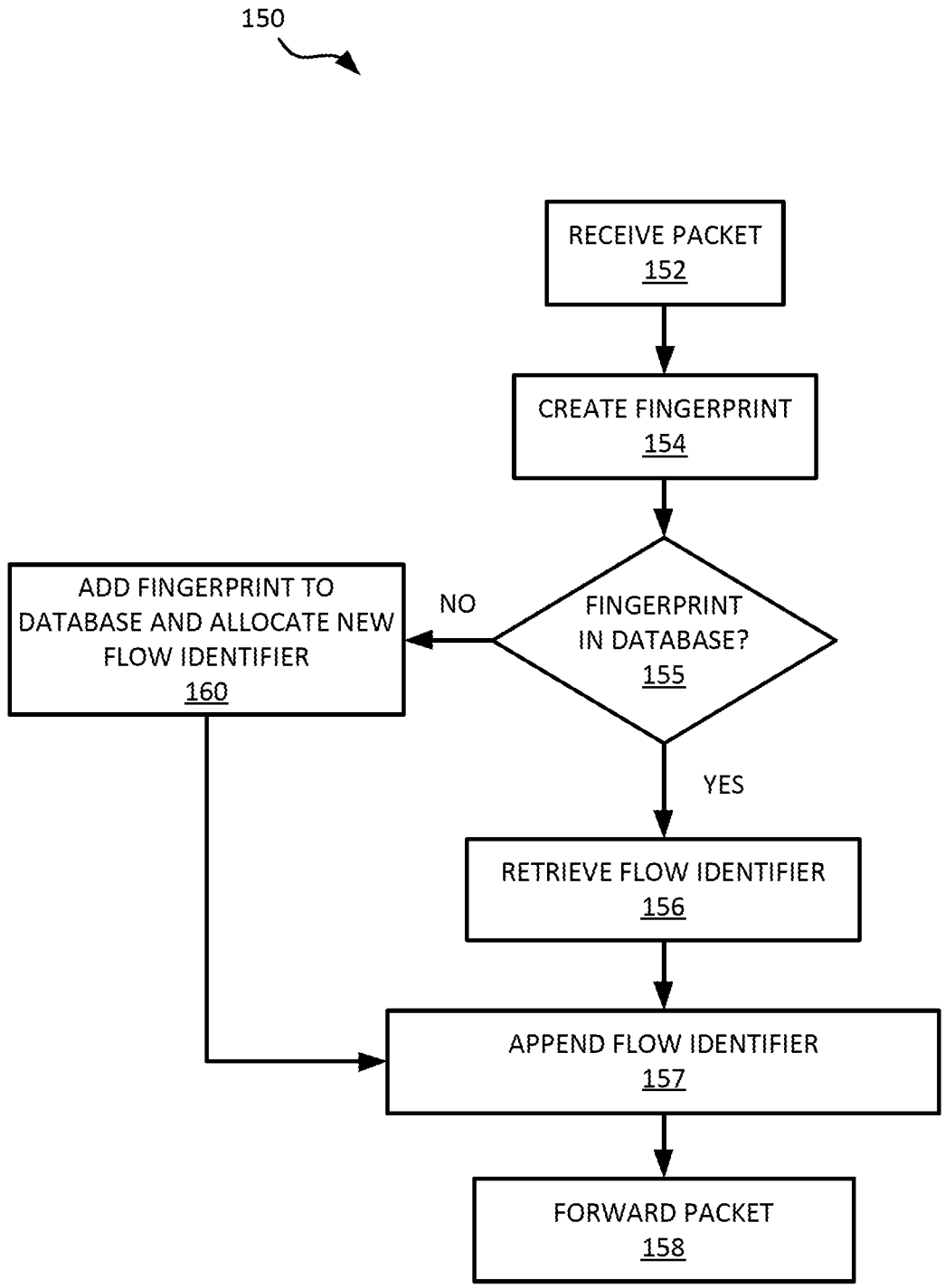
FIG. 1C is a flow diagram of a method for characterizing a packet's flow.

FIG. 1C is a flow diagram of a method 150 for identifying a packet's flow. At 152 a packet is received by, for example, flow cache 112 of FIG. 1B. At 154 a fingerprint is created and the flow database queried for the presence of the fingerprint. If the fingerprint is found in the flow database (YES at 155), then its flow identifier is retrieved at 156 and appended to the packet at 157. The packet is then forwarded to the next stage of processing at 158.

If the fingerprint is not found in the flow database (NO at 155) then the fingerprint is added to the flow database at 160 and a new flow identifier is allocated to it and stored in the flow database. The new flow identifier is appended to the packet at 157. The packet is forwarded to the next stage of processing at 158.

In some embodiments, flow cache 112 collects statistics about the packets and flows it receives and could export those statistics to a packet flow analyzer such as flow analyzer 130. Flow analyzer 130 could be an external, third party flow analyzer. Flow analyzer 130 could comprise general purpose computing hardware running software, such as for example, the NetFlow Analyzer application sold by ZoHo Inc or the Flowmon application suite sold by Flowmon Networks. In another embodiment flow analyzer 130 is part of UCP 100.

Examples of packet statistics collected by flow cache 112 could include any one or more of: the total number of packets received or transmitted over a certain time period, or the total number of packets corresponding to a particular protocol received or transmitted over a certain time period. Examples of flow statistics could include any one or more of: the total number of packets or bytes in a particular flow, the beginning and end times of the flow or the direction of the flow (i.e. from the "A" side to "Z" side or from the "Z" side to the "A" side). Any or all of these flow statistics could be stored in the flow database of flow cache 112 as part of a flow's record along with the flow identifier mentioned previously.

Other information could also be stored in the flow database as part of the flow record. This could include, for example, which TCP flags have been observed in the flow. TCP flags are each one bit long and are defined in the Transmission Control Protocol. TCP flags include the SYN flag, the ACK flag and the FIN flag.

The flow database could be automatically updated by the flow cache 112. Database updates could include adding a new flow, allocating a flow identifier to a new flow, deleting a flow that has finished or updating the flow's statistics, for example. For example, if a packet's fingerprint is found at 155 in FIG. 1C then the packet count for the packet's flow could be updated. If a new fingerprint were added to the database at 160 in FIG. 1C then the starting time for that packet's flow could be recorded, a flow identifier assigned and the flow's statistics initialized.

Flow cache 112 could export a flow's statistics to flow analyzer 130 when the flow ends. The end of a flow could be determined by the detection of a terminal state (for example, detection of the FIN flag of the TCP protocol) or the expiration of a time-out period during which no packets belonging to the flow have been observed. A flow's statistics could also or instead be exported periodically while the flow is active. For example, a flow's statistics could be exported every 60 seconds while it is active.

Flow cache 112 could export a flow's statistics to flow analyzer 130 using any of a variety of protocols including the Internet Protocol Flow Information Export (IPFIX) protocol or the Netflow protocol, for example. Flow cache 112 could collect information on a large number of flows simultaneously for example, on the order of millions of distinct flows.

Flow analyzer 130 could analyze the packet information from flow cache 112 for the presence of anomalies. An example of an anomaly could be one particular flow consuming a large proportion of a network's bandwidth.

Packet replicator 114 receives packets from flow cache 112. Packet replicator 114 could create copies of selected received packets and pass them to copy port 132. Copy port 132 could output copied packets externally to, for example, an intrusion detection system such as intrusion detection system 134 or to a storage medium such as a hard disk. An intrusion detection system could be, for example a SIEM (Security Information and Event Manager) system and could use artificial intelligence to detect intrusions. A SIEM could act as an intrusion detection system by analyzing events from other devices within a network, including devices other than a UCP. A SIEM could use packets copied out of a copy port, but could also or instead analyzing syslog messages (failed login attempts, traditional firewall rule violations, virus scanner results, etc.), for example.

Each wire or connection on a UCP (defined by one "A" side port and one "Z" side port, for example) could have zero or more copy ports associated with it, to support any of various replication rules. The copy ports could be physical ports or logical ports such as VLAN (Virtual Local Area Network) sub-interfaces. In an embodiment, the packet replicator 114 determines for each packet, based on packet header fields and replication rules which could be user-defined, a copy profile to which that packet is assigned. The assigned copy profile makes zero to N copies of the packet and sends the copy(ies) out of a profile-specific subset of the copy port(s) associated with this wire.

A set of replication rules defining which packets are to be copied and provided for analysis could be programmable and could be provided by an external source, such as for example, flow analyzer 130. Replication rules could be stored in a database along with a replication key which describes the packets to which the replication rule applies. The replication key could be based on the packet's header and could be, for example, a particular host or subnet address or a particular protocol. The replication rule could include different replication options such as: don't replicate the packet, replicate the packet and send it once to a particular output interface, replicate the packet and send it once to each of a list of output interfaces, replicate the packet multiple times and send all the replicated packets to a particular interface. In one embodiment there are 16 different replication options.

Flow analyzer 130 could identify anomalous flows from the flow information provided by flow cache 112 and instruct packet replicator 114 to send copies of these packets to intrusion detection system 134.

Intrusion detection system 134 could identify an intrusion and its associated malicious flow by analyzing the packets' payloads and comparing them to known malicious payloads, for example. Intrusion detection system 134 could identify suspicious and/or malicious flows to enforcement module 120. Intrusion detection system 134 could provide packet flow handling instructions and/or security rules, for example, to enforcement module 120 for these malicious flows. Intrusion detection system 134 could comprise general purpose computing hardware running a software application such as, for example, the open source Snort application. Flow analyzer 130 and intrusion detection system 134 could be third party hardware and/or software for execution by a processor or other hardware and need not necessarily be part of UCP 100. Instructions from flow analyzer 130 and/or intrusion detection system 134 to UCP 100, such as which packets to copy, which flows are anomalous, malicious and/or suspicious, packet handling instructions, and/or security rules could be provided automatically in a machine to machine fashion without human intervention.

Packet replicator 114 passes received data packets to protocol validator 116. Protocol validator 116 checks that the data packets conform to the specifications of their protocol. For example, in the case of a packet using the TCP/IP protocol, protocol validator 116 could check that the IP source and destination addresses are different and/or that an illegal port number (e.g. port zero) is not used. Protocol validator 116 could check that the packet length does not exceed the length limit of the protocol and/or that the payload length does not exceed the protocol length limit. If a packet conforms to its protocol then it is passed to membership filter 118 by protocol validator 116. If it does not conform to its protocol then it could be dropped or sent for packet inspection to an intrusion detection system such as intrusion detection system 134.

Membership filter 118 receives data packets from protocol validator 116. Membership filter 118 could provide packet filtering and/or packet marking based on the packet's properties. In one embodiment membership filter 118 filters and/or marks packets based on their membership in a predefined set. For example, membership filter 118 could filter or mark a packet based on the membership of the packet's IP source address in a predefined set of IP source addresses. In one embodiment, packets with source addresses that are set members are subject to mitigating actions such as being dropped or rate limited. Actual packet filtering might not occur at membership filter 118. Packets could also or instead be marked with their set membership information and then passed to enforcement module 120. Mitigation actions such as dropping or rate limiting one or more packets could be performed at enforcement module 120. Membership filter 118 could also or instead provide packet filtering and/or packet marking based on the packet's IP destination address.

Membership filter 118 could determine set membership using an IP source address map. The IP address map could contain an entry, for every single theoretically possible IPv4 source address in the IPv4 source address space, of a particular IPv4 source address property. An IPv4 address source property could be, for example, its blacklist membership. For example, an IP source address blacklist map could contain entries describing blacklist membership (member or not a member) for every single IPv4 source address. Each IP source address could be assigned one bit of storage. This bit could be a blacklist membership bit and store a blacklist membership value. In this example, a blacklist membership bit value of "1" could indicate membership in an IP blacklist while a blacklist membership bit value of "0" could indicate non-membership. Such an IP source address map would occupy 4 Gb of storage and could be accommodated in a "map memory". The map memory could be a single 4 Gb DRAM, for example.

The membership filter need not be restricted to filtering and or marking based on a single field or property of the data packet. For example, a digital fingerprint could be created from a transformation such as a mathematical "hash" of a packet's various characteristics such as, for example, its source IP address, its destination IP address, and/or its protocol type. Any of various types of hashing algorithm, and/or other algorithms that transform input information into a hash, digest, or other fingerprint that is unique for different sets of input information, could be used. Cyclical Redundancy Checking (CRC), MD-5 and SHA-1 are examples. The fingerprint could be a 32-bit number, for example. Packets could be filtered and/or marked based on the membership of their hash value in a predefined set of hash values. A fingerprint map could be constructed for every theoretically possible hash. The fingerprint map entries could describe the set membership of each fingerprint.

An example of a membership filter is described in U.S. application Ser. No. 15/581,454 "INTERNET PROTOCOL ADDRESS FILTERING METHODS AND APPARATUS" and is herein incorporated by reference.

Enforcement module 120 receives data packets from membership filter 118. Enforcement module 120 handles the received packet according to enforcement rules, which are programmable in some embodiments. Packet handling actions could include: transmitting the packet to TX port 122 with or without rate limiting, dropping the packet, marking the packet or redirecting the packet to a selected external service chain such as a service chain in service chain group 136 with or without rate limiting.

A service chain could be a single service external to UCP 100 such as network address translation, anti-virus protection or it could be a collection of services.

Figure 2A:
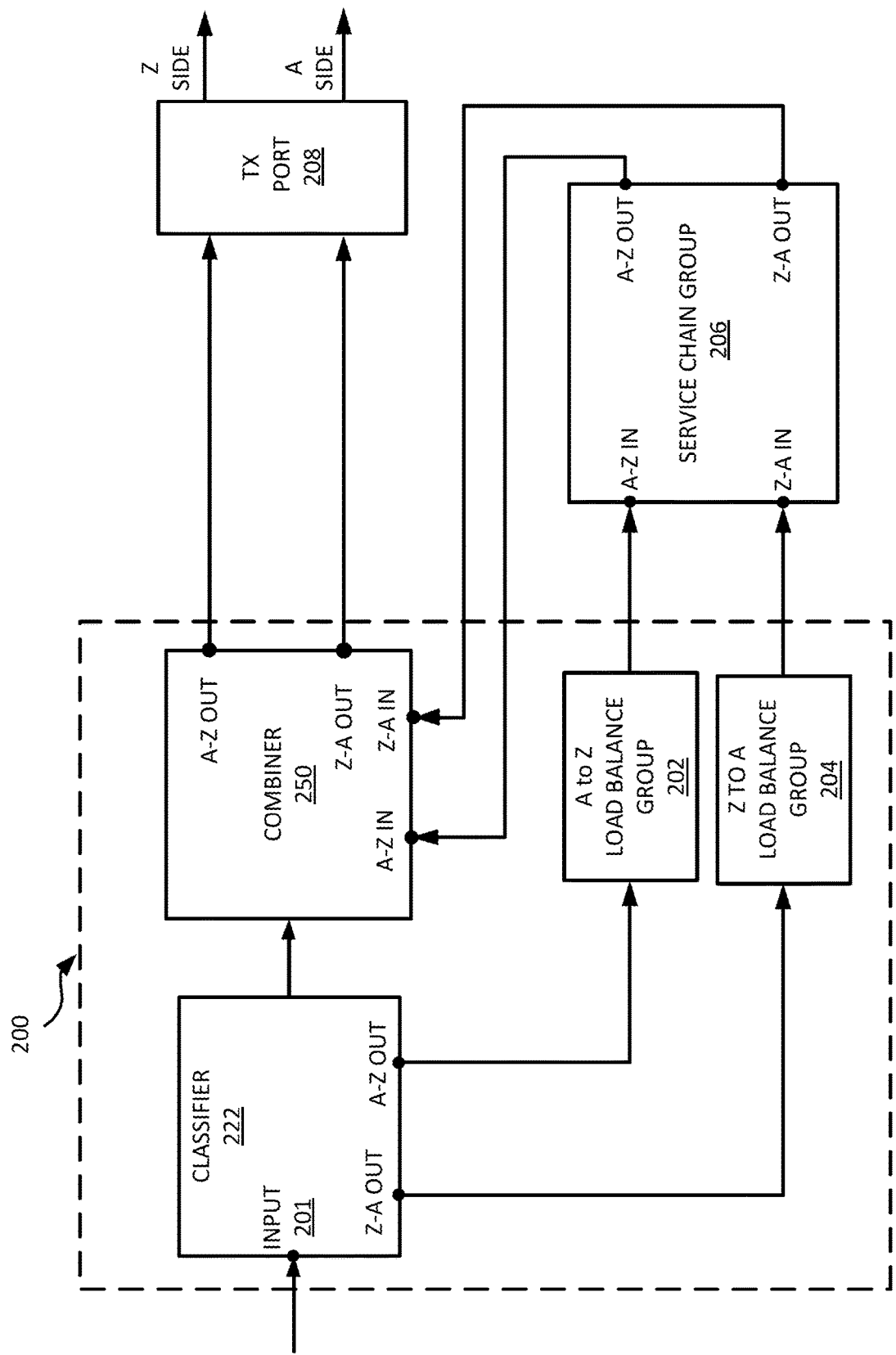
FIG. 2A is a block diagram of an example enforcement module and its associated service chains.

FIG. 2A is a block diagram of an example enforcement module and its associated service chains.

Enforcement module 200 comprises classifier 222, combiner 250, and load balancer groups 202 and 204. Classifier 222, combiner 250 and load balance group 202 and load balance group 204 could be implemented in custom logic in a single FPGA.

Enforcement module 200 receives packets at input port 201. Packets arriving at input port 201 could be coming from either the "A" side or from the "Z" side of UCP 100 of FIG. 1B, for example.

Packets destined for processing by service chain group 206 and traveling in the A to Z direction are first passed by classifier 222 to A-Z load balancer group 202 and then to the A-Z input terminal of service chain group 206.

Packets destined for processing by service chain group 206 and traveling in the Z to A direction are first passed by classifier 222 to Z-A load balancer group 204 and then to the Z-A input terminal of service chain group 206.

Load balancer groups 202 and 204 of FIG. 2A could each comprise multiple load balancers and a packet could be forwarded to a selected load balancer within the load balancer group.

Service chain group 206 could comprise multiple service chains and each service chain could comprise multiple instances of its service.

Packets traveling in the A to Z direction from service chain group 206 and not being dropped return to enforcement module 200 at its A-Z input port and are multiplexed by combiner 250 onto a single output interface. The output interface could be a physical interface such as an optical fiber or copper cable or it could be a logical interface such as a VLAN. Packets traveling in the A to Z direction could then be transmitted through TX port 208 to a device attached to the UCP's Z-side (router 103 of FIG. 1A for example).

Packets traveling in the Z to A direction from service chain group 206 and not being dropped return to enforcement module 200 at its Z-A input port and are multiplexed by combiner 250 onto a single output interface. The output interface could be a physical interface such as an optical fiber or copper cable or it could be a logical interface such as a VLAN. Packets traveling in the Z to A direction could then be transmitted through TX port 208 to a device on the UCP's A-side (router 101 of FIG. 1A for example).

Figure 2B:
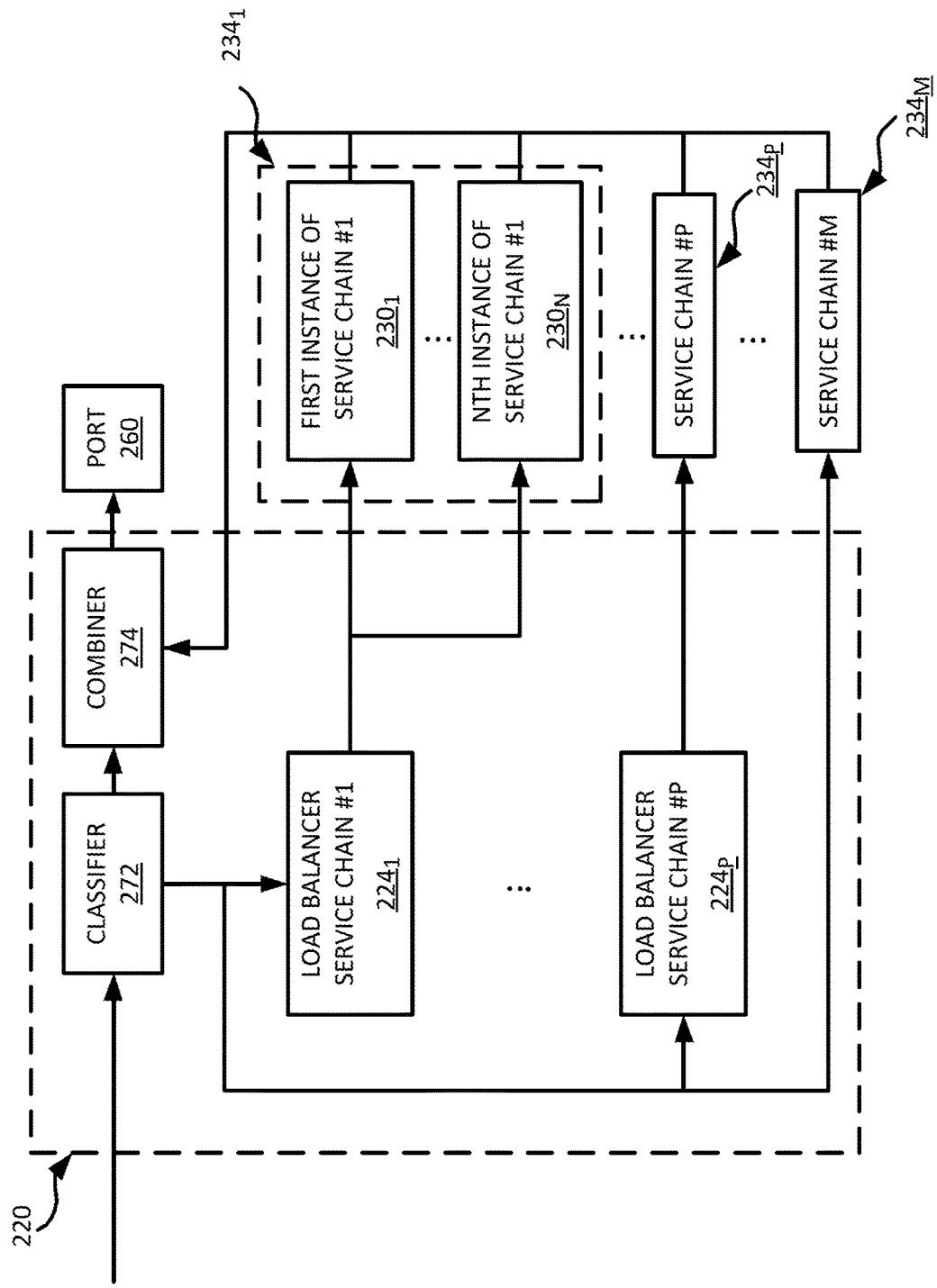
FIG. 2B is a block diagram of the portions of an example enforcement module for processing packets in one direction (e.g. A to Z).

FIG. 2B is a block diagram of the portions of an example enforcement module for processing packets in one direction (for example in the A to Z direction). Enforcement module 220 comprises packet classifier 272, load balancers $224_1 \ldots 224_P$ and packet combiner 274.

Classifier 272 classifies received packets into different packet handling classes according to a set of classification rules, which are programmable in some embodiments. Rules for classifier 272 could be based on a packet's characteristics or combination of characteristics. These could include, for example, any one or more of: its destination IP address, source IP address, TCP/UDP destination or source port, TCP header flags, packet length, ICMP (Internet Control Message Protocol) type, ICMP code, IPv4 protocol number, IPv4 DSCP (Differentiated Services Code Point), IPv4 fragment flags, IPv6 protocol number, IPv6 traffic class, and set membership information created by membership filter 118 (FIG. 1B).

Packets could also or instead be classified according to other contextual information such as, for example the packet's ingress network interface (e.g. 10G Physical Port 3 or VLAN sub-interface 145 on Physical Port 7), the time of day the packet arrived or an externally tracked flow state (e.g. the flow has been allowed by a firewall, the packet is related to a flow allowed by a firewall, a synchronize request has been received for this flow).

The particular information used to classify a packet is sometimes referred to as a "key".

A packet classification method could make use of a data structure to classify a packet. The data structure could store one or more keys and each key's associated packet handling class.

The packet handling class could determine what action is to be taken with the packet by enforcement module 220.

For example, depending on their class, packets could be dropped, forwarded by classifier 272 to combiner 274, or redirected to one of service chains $234_1 \ldots 234_M$. Packets could be forwarded to combiner 274 or service chains $234_1 \ldots 234_M$ with or without rate limiting or DSCP (Differentiated Services Code Point) remarking.

When a packet is received by classifier 272 its key could be determined and the data structure could then be searched for a matching key. If a matching key is found in the data structure then the packet could be handled according to the matching key's associated packet handling class.

If a match is not found in the data structure then the packet could be processed according to a default packet handling class which could result in the packet being sent to combiner 274. The UCP could also or instead send non-matching packets to a default service chain.

A description of an example classification scheme is described in U.S. application Ser. No. 15/835,761 "PACKET CLASSIFICATION USING A FINGERPRINT HASH TABLE" and is herein incorporated by reference.

Classification rules for enforcement module classifier 272 could be programmed using any of a number of well known standards such as for example, the OpenFlow standard or the Border Gateway Protocol (BGP) Flow Spec, for example. Classification rules could also or instead be directly defined using a Command Line Interface.

Classification rules could also or instead be supplied by third party tools such as an intrusion detection system such as intrusion detection system 134 in FIG. 1B in an automated, machine to machine fashion.

Classifier 272 could support a large number of classification rules. In one embodiment classifier 272 supports over 224,000 rules for classifying IPv4 packets and 120,000 rules for classifying IPv6 packets.

A service chain could be a single service such as: TLS (Transport Layer Security); network address translation; application payload inspection, decryption or modification; full packet storage to disk; firewalling; anti-virus protection, or it could be a collection of services.

Service chains $234_1 \ldots 234_M$ perform their particular service on the received packets.

Services performed by service chains $234_1 \ldots 234_M$ could include, for example, forwarding a packet to combiner 274, dropping a packet, or rate limiting a packet. Combiner 274 could recombine all the packets received from the different service chains onto a single output interface.

Each of service chains $234_1 \ldots 234_M$ could be different and perform a different service or collection of services. There could be multiple instances of a service chain. For example, in FIG. 2B service chain $234_1$ comprises "N" service chain instances $230_1 \ldots 230_N$. Service chain instances $230_1 \ldots 230_N$ all perform an identical service or collection of services.

Service chain instances could be separate physical devices with physical ports.

In another embodiment, service chain instances $230_1 \ldots 230_N$ are virtualized and are not separate physical devices. In this embodiment, the service chain instances are created using software and run on general purpose hardware such as a server rather than on hardware specifically designed to deliver the service or collection of services. Multiple service chain instances could run on a single piece of physical hardware. In this embodiment the number of service chain instances $230_1 \ldots 230_N$ is flexible. Service chain instances can be added or removed based on demand for the service chain. For example, during periods of low demand for a particular service chain the number of service chain instances could be minimized. If there is an increase in demand for the service chain however, then additional service chain instances could be created. The general purpose hardware to host service chain instances might not be local to a UCP or even to the network but could instead be remotely (cloud) based.

In the case of virtualized service chain instances, packets could be forwarded to the service chain instances in any of a variety of ways. For example, packets could be forwarded using tunneling in which a tunnel identifier could be appended to the packets. An example of a tunnel identifier would be Virtual Local Area Network (VLAN) tags. In this embodiment each service chain instance is on a different VLAN and the VLAN tags direct the packet to the appropriate service instance.

In the case of multiple instances of a service chain, such as service chain $234_1$ or service chain $234_P$, a packet could first be passed through a load balancer, such as one of load balancers $224_1 \ldots 224_P$. Load balancers could attempt to balance the loading between individual service chain instances within a service chain.

For example, in FIG. 2B, packets destined for service chain $234_1$ first pass through load balancer $224_1$. Load balancer $224_1$ provides load balancing for service chain $234_1$ and forwards each packet to one of service chain instance $230_1 \ldots 230_N$. Load balancer $224_1$ could attempt to equalize loading between service chain instances $230_1 \ldots 230_N$. In one embodiment load balancers $224_1 \ldots 224_P$ can each support up to 128 service chain instances.

There could be only a single instance of a service chain. For example, in FIG. 2B there is only a single instance of service chain $234_M$. In the case of a single instance of a service chain a packet could be passed directly to it by classifier 272 without passing through a load balancer.

A load balancer could forward a packet to a specific service chain instance of a service chain by calculating a hash value from selected fields in a packet's header. Based on the hash value, the load balancer could then determine which service chain instance receives and processes the packet. For example, if there are "N" service chain instances $230_1 \ldots 230_N$ of service chain $234_1$ then a hash value of bit length "R" could be calculated from selected fields in the packet's header and this value could determine which of the "N" service chain instances receives and processes the packet.

It could be advantageous to compute a hash value with a range larger than N to reduce discretization error when the hash value is a power of two and the number of service chain instances (N) is not a power of two. For example, if N=7 a 16-bit hash value could be computed resulting in 64K possible hash values. The 64K hash values could be distributed over the seven service chain instances using a distribution function. The distribution function maps hash values to service chain instance values. For example, the lowest seven hash values (00, . . . 06) could each be assigned one of the seven service chain instances and this could be then repeated for the next seven lowest hash values (07 . . . 15) and so on until all possible hash values have a service chain instance assigned.

The distribution function could be implemented as a look-up table stored in memory, which could be implemented in one or more storage devices. This service chain instance distribution look-up table could comprise all possible hash values and a corresponding service chain instance for each hash value. FIG. 3A is a diagram of an example service chain instance distribution look-up table 301. The left hand column comprises sequential values of a 16-bit hash in octal format. The right hand column comprises corresponding service chain instances in decimal format, for an embodiment with N=7 service chain instances. FIG. 3A is an example only and other implementations are possible. For example, the service chain instances in the right hand column need not be ordered sequentially.

Figure 3B:
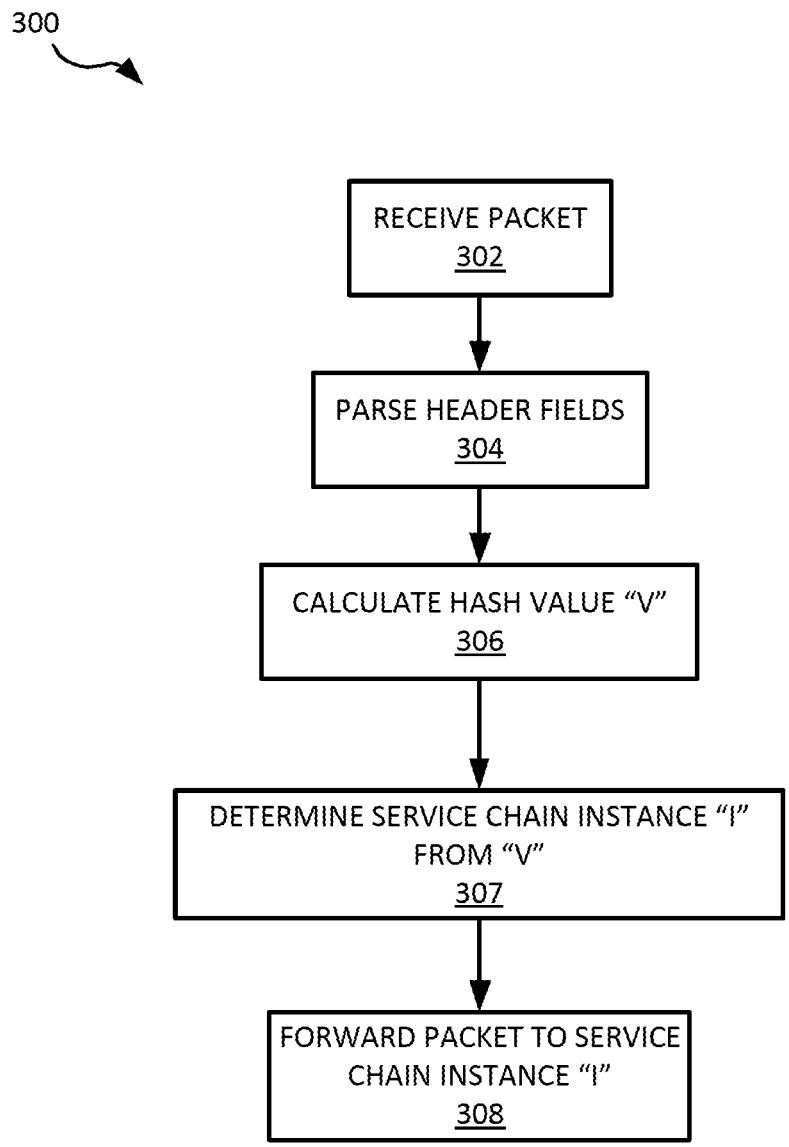
FIG. 3B is a flow diagram of a service chain instance selection method.

FIG. 3B is a flow diagram of a service chain instance selection method 300 which could be executed on a load balancer, such as load balancer $224_i$ of FIG. 2B. At 302 a packet is received by a load balancer. At 304 the packet's header is parsed into header fields. At 306 a hash value "V" is calculated from selected fields in the packet's header. At 307 a service chain instance index "I" is determined based on hash value "V" and a distribution function. Service chain instance index "I" might be determined from hash value "V" using a look-up table. At 308 the load balancer forwards the packet to service chain instance "I".

In one embodiment, the selected fields in the packet's header used to create the hash value are those fields chosen to characterize the packet's flow.

In this embodiment, all packets that are forwarded by classifier 272 to the same service chain $234_1 \ldots 234_M$ and that belong to a particular flow will pass through the same service chain instance. For example, all packets belonging to the same flow and forwarded to service chain $234_1$ would all pass though the same service chain instance $230_1 \ldots 230_N$. This could be advantageous for certain types of packet processing services. for example, a TCP connection request being processed by a service chain implementing a stateful firewall. The firewall needs to see all of the connection setup packets to decide whether to allow or deny the TCP connection. Once a connection is allowed on a particular instance of the firewall, data packets sent on that connection and received by that instance will be forwarded; however any data packets sent to a different instance would be dropped since that instance did not receive the connection set-up packets.

Data communications could be two way and comprise a packet flow sent from a first host to a second host and traveling in the A to Z direction and a corresponding return flow sent from the second host to the first host in response to the packet flow and traveling in the Z to A direction. Two way communications could use any two way communications protocol such as TCP, for example. The packet flow could pass through a first load balancer (e.g. one of load balancer group 202 in FIG. 2A) and the corresponding return flow could pass through a second load balancer (one of load balancer group 204 in FIG. 2A). The first and second load balancers in this example comprise a load balancer pair.

Load balancers such as, for example, load balancers $224_1 \ldots 224_P$ of FIG. 2B could calculate a packet's hash value using a symmetric hash function. The symmetric hash function could be designed to produce identical hash values and service chain instance indices for all packets in a packet flow and all packets in the corresponding return flow. This could ensure that all packets in a packet flow and the corresponding return flow pass through the same service chain instance. This could be advantageous for certain types of packet processing services, such as for example, Transport Layer Security (TLS) or Secure Socket Layer (SSL) decryption or firewalls.

For example, referring to FIG. 1A, if a particular packet flow is transmitted from router 101 to router 103 through UCP 102 and the packet flow is directed to a service chain (for example, one of $234_1 \ldots 234_M$ of FIG. 2B) then using symmetric hashing, the service chain instance handling the packet flow also handles the corresponding return flow from router 103 to router 101.

A packet flow and its corresponding return flow typically have their IP source and destination addresses transposed and their source and destination port addresses transposed. For example, the IP source address of the flow is the IP destination address of the corresponding return flow and the IP destination address of the flow is the IP source address of the corresponding return flow. Similarly, the source port number of the flow is the destination port number of the corresponding return flow and the destination port number of the flow is the source port number of the corresponding return flow.

A variety of symmetric hash functions are possible. For example, an exclusive OR operation (XOR) could be performed on the packet's IP source and destination addresses and the packet's source and destination port addresses, resulting in the same hash value for pairs of source and destination addresses regardless of which address is the source and which is the destination.

In another embodiment of a symmetric hash, the packet's source and destination addresses and source and destination port numbers could be transposed based on the direction of travel of the packet prior to computing the hash value. For example, referring to FIG. 1A, UCP 102 has only two endpoints, its "A" side connection to router 101 and its "Z" side connection to router 103. A packet can therefore have only two directions, A to Z (traveling from the "A" side to the "Z" side) or Z to A (traveling from the "Z" side to the "A" side). So for example, the IP source and destination addresses and the source and destination port numbers of packets traveling from the "A" side to the "Z" side might not be transposed while for packets traveling from the "Z" side to the "A" side the IP source and destination addresses could be transposed and the source and destination port numbers could be transposed prior to calculating the hash value. This results in the same hash value for pairs of IP source and destination addresses and source and destination port numbers regardless of which address or port number is the source and which is the destination. The direction of a packet could be marked on the packet when it was initially received by the UCP.

Figure 4:
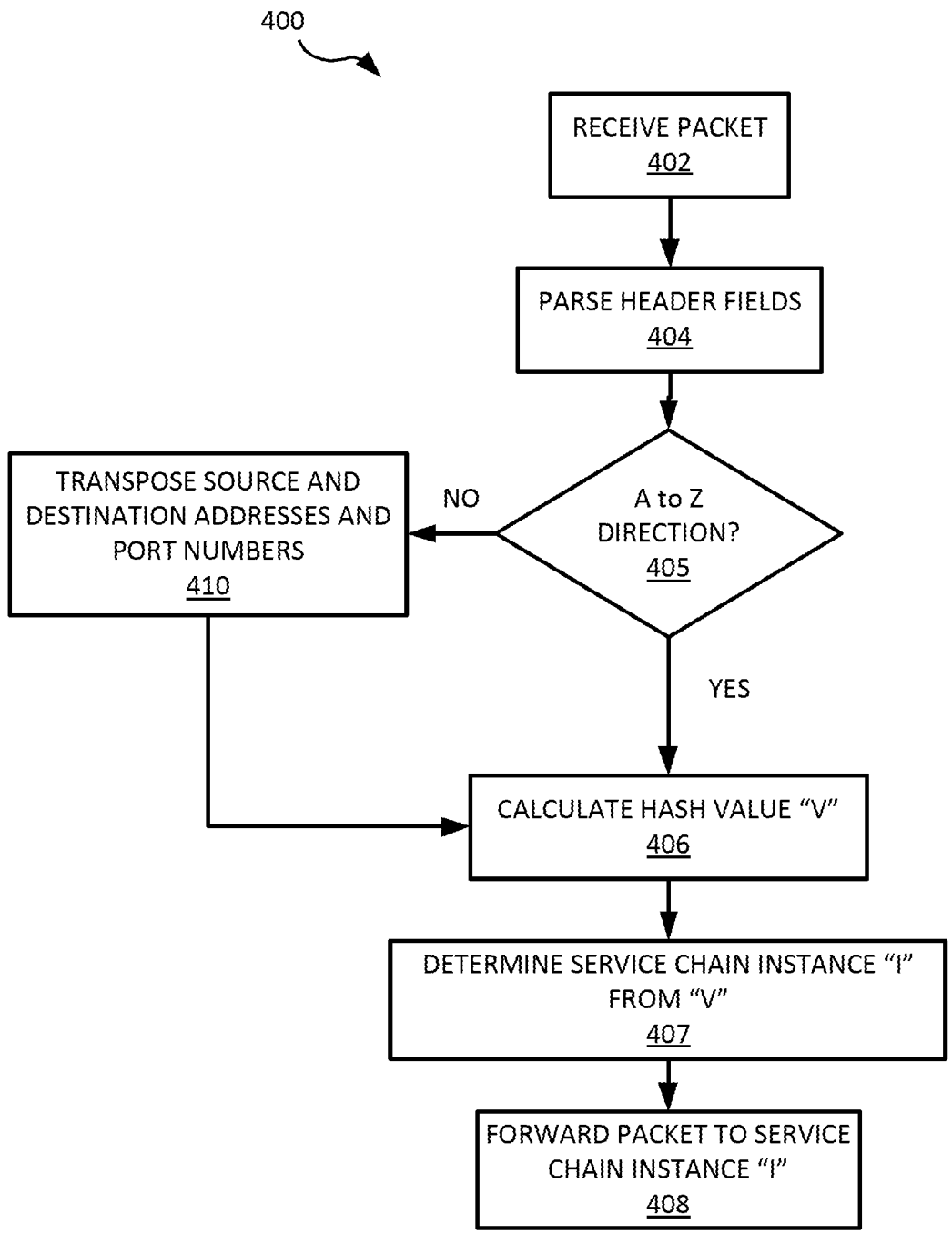
FIG. 4 is a flow diagram of a symmetric hash calculation method using transposition.

FIG. 4 is a flow diagram of symmetric hash calculation method 400 using transposition. At 402 a packet is received. At 404 the packet's header is parsed into fields. At 405 the direction of the packet is determined. If the packet is in the A to Z direction (YES at 405) then a hash value "V" is calculated at 406. If the packet is not in the A to Z direction (NO at 405) then at 410 the packet's source and destination addresses are transposed and the packet's and source and destination port numbers are transposed and a hash value "V" is calculated at 406. At 407 a service chain instance index "I" is determined from hash value "V". At 408 the packet is forwarded to service chain instance "I".

Load balancer pairs could support "fate sharing" between a packet flow and its corresponding return flow. Fate sharing involves removing a service chain instance on an indication that the service chain instance can no longer process either the packet flow or the corresponding return flow. For example, if a packet flow traveling in the "A" to "Z" direction can no longer be processed by its intended service chain instance "K" due to, for example, a link failure, then the load balancer for that flow could stop forwarding all packet flows to that service chain instance by, for example, removing the service chain instance from its service chain instance distribution look-up table. The load balancer could also communicate the failure of service chain instance "K" to the other load balancer in the pair (for the return flow) and that other load balancer could also terminate forwarding of all packet flows to service chain instance "K" by removing the service chain instance from its service chain instance distribution look-up table.

In some embodiments, both the packet flow and its corresponding return flow are reassigned to a new service chain instance whenever any path to a previously assigned service chain instance has been removed.

For example, a failure could be detected by a load balancer based on link-down indications on one or more physical or logical connections between a UCP and a service chain instance, and/or via an active, in-band, signaling mechanism. The physical or logical connection for one direction could be declared to be down, and that link-down state could be propagated to the peer load balancer in a load balancer pair so that the peer load balancer can forcibly take the corresponding physical or logical connection down for the other direction. The packet flow and the corresponding return flow themselves could be re-assigned to a new service chain instance. This re-assignment could result in the service chain dropping the flows in some embodiments.

Load balancing between service chain instances as described above could be stateful. In stateful load balancing a record is kept of which service chain instance the first packet in a flow is forwarded to and all subsequent packets in the same packet flow are forwarded to the same service chain instance. The service chain and/or the service chain instance could be recorded in the flow database of the UCP's flow cache (flow cache 112 of FIG. 1B for example).

A stateful load balancer could have a number of advantages over a stateless load balancer. In a stateless load balancer a packet is forwarded to the service chain instance index calculated from its hash value, by for example, a service chain instance look-up table such as look-up table 301 of FIG. 3A. If the number of service chain instances "N" in a service chain is changed then some of the service chain instance indices calculated from the hash value might also change. For example, if an eighth service chain instance were added to the service chain for service chain look-up table 301 then hash value "07" might be reassigned this new eighth instance, hash value "10" might be reassigned the first service chain instance, hash value "11" reassigned the second service chain instance and so on.

If the number of service chain instances is changed while a packet flow is active this could result in the service chain instance for that packet flow changing. Packets in the flow arriving after the change could be directed to a different service chain instance than packets which arrived before the change. For instance, referring to the above example, packets with hash value "07" arriving before the creation of the eighth service chain instance would be directed to the seventh service chain instance while packets arriving afterward would be directed to eighth service chain instance. The initial part of the flow would therefore be processed by the first service chain instance while the later part of the flow would be processed by the eighth service chain instance. This could disrupt the packet flow.

Multiple active packet flows in the service chain could potentially be disrupted by a change in the number of service change instances if the load balancer is stateless.

In a stateful load balancer disruption to active packet flows could be minimized. For example, the addition of a new service chain instance might not cause disruption to any active packet flows. Packets in an active packet flow would continue to be processed by the same service chain instance regardless of changes to the service chain instance look-up table. In the above example, packets in a flow with the hash value of "07" arriving before the creation of the eighth service chain instance would be directed to the first service chain instance and packets in the same flow arriving after the creation of the service chain instance would continue to directed to first service chain instance. Only new flows with hash value "07" would be directed to the eighth service chain instance.

In a stateful load balancer the deletion (intentional or accidental) of a service chain instance would only disrupt active packet flows flowing through the deleted service chain instance.

For example, referring to look-up table 301 of FIG. 3A, if the seventh service chain instance was deleted then packets in a flow with the hash value of "07" arriving before the deletion would be directed to the seventh service chain instance and packets in the same flow arriving after the deletion would continue to be directed to (now deleted) seventh service chain instance. Active flows with the hash value of "07" would therefore be disrupted, however active packet flows in the other remaining service chain instances would be unaffected.

Figure 5:
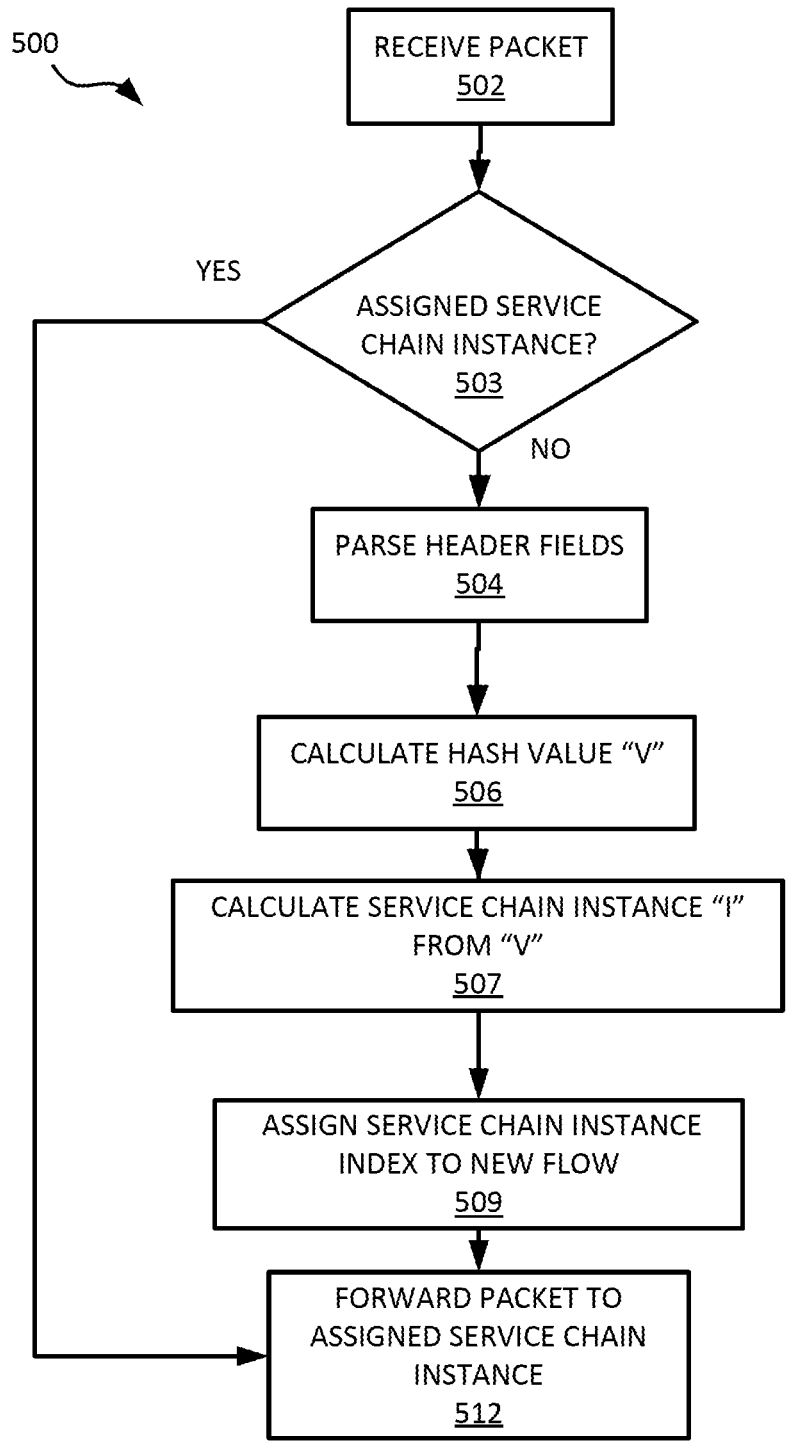
FIG. 5 is a flow diagram of a stateful load balancing method.

FIG. 5 is a flow diagram of a stateful load balancing method 500.

At 502 a load balancer (such as load balancer 224₁ of FIG. 2B) could receive a packet. At 503 the load balancer could determine whether the packet is from a previously known flow for which there is an assigned service chain instance index. The packet flow could be determined at 503 or a packet flow identifier could have previously been appended to the packet.

If the packet is from a previously known flow for which there is an assigned service chain instance index (YES at 503) then the packet is forwarded to the service chain instance index corresponding to the assigned service chain instance index at 512.

If there is no assigned service chain instance index for the packet (NO at 503) then at 504 the packet's header is parsed. At 506 a hash value "V" is calculated from selected header fields. At 507 a service chain instance index "I" is calculated from hash value "V".

At 509 the newly calculated service chain instance index is assigned to the packet flow. Assignment could involve recording the service chain index and the packet's flow identifier in a flow database such as the flow database of flow cache 112 of FIG. 1B, for example At 512 the packet is forwarded to the service chain instance index.

Other state information for a flow could also or instead be stored in the flow database. This could include a flow's set membership information as determined by a membership filter (for example membership filter 118 of FIG. 1B), which enforcement rules apply to the flow (for example, enforcement rules as determined by enforcement module 120 of FIG. 1B) or the TCP Initial Sequence Number (ISN) of the flow.

Embodiments are disclosed by way of example above. The disclosed embodiments include, for example, a system for handling packet flows between a pair of network security zones in a communications network. Such a system could include a receiver to receive a packet that is sent from one of the network security zones toward the other of the network security zones. The RX port 110 in FIG. 1B is an example of such a receiver. An enforcement module is coupled to the receiver, to direct the packet to a packet processing service chain based on a packet handling classification of a packet flow of which the packet is a part. FIG. 1B shows an example embodiment in which an enforcement module 120 is coupled to a receiver through other components, and directs packets to a service chain in the service chain group 136.

A service chain may have multiple identical service chain instances, as shown in FIG. 2B, for example, to perform a service on packets. The enforcement module 120 is configured to direct a packet to one of the service chain instances within the service chain.

A transmitter, shown by way of example as TX port 122 and 208 in FIGS. 1B and 2A, respectively, is coupled to the enforcement module 120 to transmit a packet that has been processed by any of the service chain instances to the other network security zone.

The embodiment shown in FIG. 1B also includes a flow cache 112, coupled between the receiver and the enforcement module 120, to characterize the packet as part of the packet flow. The flow cache 112 could be configured to append, to a packet, a flow identifier to identify the packet flow of which the packet is a part. In an embodiment, the flow identifier is or includes a fingerprint that is generated based on one or more packet characteristics of the packet.

A memory could be coupled to the flow cache 112, to store a flow database that includes packet fingerprint values and respective corresponding flow identifiers. In such embodiments, the flow cache 112 could be configured to characterize the packet as part of the packet flow by determining a fingerprint based on one or more packet characteristics of the packet and querying the flow database for a packet fingerprint value matching the fingerprint determined for the packet.

The flow cache 112 could be further configured to retrieve, from the flow database, the flow identifier corresponding to the packet fingerprint value matching the fingerprint determined for the packet where the flow database includes a packet fingerprint value matching the fingerprint. The flow cache 112 could also or instead be further configured to add, to the flow database, the fingerprint determined for the packet and a new flow identifier where the flow database does not include a packet fingerprint value matching the fingerprint.

With reference again to FIG. 2B, the classifier 272 would be coupled to the receiver, to classify a packet flow according to a set of one or more classification rules, and thereby determine the packet handling classification of the packet flow. The enforcement module 220 includes the classifier 272 in the example shown in FIG. 2B.

The example enforcement module 220 also includes load balancers $224_1 \ldots 224_P$. A load balancer is operative to direct a packet to a service chain instance, and to balance loading of multiple service chain instances.

A load balancer could be configured to determine a hash value based on contents of a header of a packet, and to determine the one of the service chain instances to which the packet is to be directed based on the determined hash value and a distribution function. In some embodiments, the packet handling classification of a packet flow is based on one or more fields in a packet header, and the determined hash value is based on the same one or more fields in the packet header.

Some embodiments involve load balancer pairs. For example, an enforcement module could include multiple load balancers, as shown in FIG. 2B. Packets in a packet flow that are sent from a first host to a second host could be handled by a first load balancer, and packets in a corresponding return flow that are sent from the second host to the first host in response to the packet flow could be handled by a second load balancer. The first and second load balancers in this example could be considered a load balancer pair, and could be configured to direct all of the packets in the packet flow and all of the packets in the corresponding return flow to the same one of the service chain instances.

This type of load balancing by load balancer pairs could be implemented by configuring the first and second load balancers to determine hash values based on contents of packet headers and a symmetric hash function, and to determine service chain instances to which packets are to be directed based on the determined hash values. The symmetric hash function produces identical hash values for all of the packets in the packet flow and all of the packets in the corresponding return flow, to direct all of the packets in the packet flow and all of the packets in the corresponding return flow to the one of the service chain instances.

One example of a symmetric hash function involves performing an XOR on packet source and destination addresses, such as IP and/or port addresses, and determining the hash values based on a result of the XOR, to provide the same hash value for pairs of source and destination addresses.

Another symmetric hash function involves determining the hash values based on packet source and destination addresses and source and destination port numbers for the packets in one of the packet flow and the corresponding return flow, and determining the hash values for the packets in the other of the packet flow and the corresponding return flow based on transposed packet source and destination addresses and transposed source and destination port numbers, to provide the same hash value for pairs of source and destination addresses and source and destination port numbers.

A load balancer could provide stateful load balancing between service chain instances. Stateful load balancing could involve keeping a flow record that is associated with a packet flow and that includes an identifier of the one of the service chain instances to which packets in the packet flow are to be directed, and directing the packet and all other packets in the packet flow to that particular one of the service chain instances. In other words, stateful load balancing could involve directing a first packet in any one packet flow to a service chain instance of multiple service chain instances, keeping a flow record that is associated with the packet flow and that includes an identifier of the service chain instance, and directing all subsequent packets in the packet flow to the same service chain instance.

The identifier of a service chain could be or include a service chain index, for example. Stateful load balancing could then involve determining whether each received packet is from a packet flow for which a flow record associated with the packet flow includes a service chain instance index and, for each received packet from a packet flow for which a flow record associated with the packet flow includes a service chain instance index, directing the received packet to a service chain instance associated with the service chain instance index in the flow record.

Fate sharing is another feature that could be provided in some embodiments. The enforcement module 120, for example, could be configured to provide fate sharing between the packet flow and a corresponding return flow that are processed by the same service chain instance, for example. Fate sharing refers to removing a service chain instance on an indication that the service chain can no longer process either of the packet flow or the corresponding return flow. In the context of a load balancer pair, the first load balancer and the second load balancer could be configured to communicate fate information associated with one or both of the packet flow and the return packet flow. One load balancer in a load balancer pair could communicate a failure or error indication, such as a failure message or flag, to the other load balancer in the pair in the event of a link failure, for example. The link-down state referenced above is an example of fate information that could be communicated or otherwise propagated from one load balancer to a peer load balancer in a load balancer pair. Such communication between the load balancers in a load balancer pair could be used to implement fate sharing.

Regarding service chain instances, one or more of these could be virtualized service chain instances that are implemented using software for execution by general purpose computing hardware. A single implementation of the general purpose computing hardware could be configured to execute multiple virtualized service chain instances.

A number of virtualized service chain instances could be adaptable based on demand for the service chain. This adaptation could be automatic without human intervention. For example, enforcement module 220 of FIG. 2B could communicate a number of virtualized instances to service chains $234_1 \ldots 234_M$.

In some embodiments, each service chain instance is associated with a different tunnel and tunnel identifier, and the enforcement module is configured to direct packets to the service chain instances using a tunnel identifier.

Referring again to FIG. 1B, a system consistent with the present disclosure could also include other components, such as a packet flow analyzer 130, coupled to the flow cache 112, to analyze packet flows based on statistics collected by the flow cache about packets and packet flows.

A packet replicator 114 could be coupled between the receiver and the enforcement module 120 to create copies of selected received packets, and a copy port 132 could be coupled to the packet replicator to output the copies of the selected packets.

An intrusion detection system as shown at 134 could be coupled to the copy port 132, to receive the copies of the selected packets and detect intrusions based on the copies of the selected packets. A storage medium could also or instead be coupled to the copy port 132, to receive and store the copies of the selected packets. The copies of the selected packets could be processed on the fly, and need not necessarily be stored in all embodiments.

The embodiment in FIG. 1B also includes a protocol validator 116, coupled between the receiver and the enforcement module 120, to determine whether received packets conform to protocol specifications and to perform a non-conformance action on a non-conforming packet that does not conform to the protocol specifications. The non-conformance action could include any one or more of: dropping the non-conforming packet, and sending the non-conforming packet for packet inspection, for example.

A membership filter 118 could also or instead be coupled between the receiver and the enforcement module 120, to provide one or both of packet filtering and packet marking based on packet properties. For example, the membership filter 118 could be configured to filter packets, mark packets, or both, based on membership in a predefined set.

Another feature that could be provided in some embodiments relates to line rate processing. A system could be configured to process packets at a rate equal to or greater than a maximum transmission rate between the pair of network security zones. As noted above, a UCP could be designed with enough processing power to process packets at a line rate.

One or more components of a system could be configured for machine to machine communication with one or more external components. The system components configured for machine to machine communication could include, for example, any of: flow cache 112, packet replicator 114, protocol validator 116, membership filter 118, and enforcement module 120 in FIG. 1B. External components configured for machine to machine communication could include any one or more of: flow analyzer 130, intrusion detection system 134, and a service chain or service chain group 136.

In particular, according to some embodiments disclosed herein:
- the enforcement module 120 is configured for machine to machine communication with one or more external components;
- the flow cache 112 is configured for machine to machine communication with one or more external components;
- the flow cache 112 is configured for machine to machine communication with the packet flow analyzer 130;
- the packet replicator 114 is configured for machine to machine communication with one or more external components;
- the intrusion detection system 134 is further configured for machine to machine communication with one or more other components of the system;
- the protocol validator 116 is configured for machine to machine communication with one or more external components;
- the membership filter 118 is configured for machine to machine communication with one or more external components.

Method embodiments are also disclosed. The disclosed embodiments include, for example, a method for handling packet flows between a pair of network security zones in a communications network. Such a method could include receiving a packet that is sent from one of the network security zones toward the other of the network security zones, as shown by way of example at 302 in FIG. 3B. A method could also include directing the packet to a packet processing service chain based on a packet handling classification of a packet flow of which the packet is a part. The service chain has multiple identical service chain instances to perform a service on packets, and the directing involves directing the packet to one of the service chain instances within the service chain. The forwarding at 308 in FIG. 3B is an example of such directing of a packet to a service chain and service chain instance. A packet processed by any of the service chain instances could be transmitted to the other network security zone.

A method could also involve characterizing the packet as part of the packet flow, and appending to the packet a flow identifier to identify the packet flow of which the packet is a part. The flow identifier could be or include a fingerprint that is generated based on one or more packet characteristics of the packet. FIG. 1C illustrates an example method in which a packet that is received at 152 is characterized as part of a packet flow based on a fingerprint that is generated at 154. FIG. 1C also includes appending a flow identifier to the packet at 157.

In some embodiments, a method involves storing, in a memory, a flow database that includes packet fingerprint values and respective corresponding flow identifiers. The example method illustrated in FIG. 1C uses such a flow database, and characterizing the packet in this example method involves determining a fingerprint based on one or more packet characteristics of the packet at 154 and querying the flow database at 155 for a packet fingerprint value matching the fingerprint determined for the packet. The characterizing in this example method also involves retrieving from the flow database, at 156, the flow identifier corresponding to the packet fingerprint value matching the fingerprint determined for the packet where the flow database includes a packet fingerprint value matching the fingerprint, and adding to the flow database, at 160, the fingerprint determined for the packet and a new flow identifier where the flow database does not include a packet fingerprint value matching the fingerprint.

A method could also involve classifying a packet flow according to a set of one or more classification rules, to determine the packet handling classification of the packet flow.

Some embodiments involve load balancing of the service chain instances. The load balancing could involve determining a hash value based on contents of a header of the packet, as shown at 306 in FIG. 3B for example, and determining the one of the service chain instances to which the packet is to be directed based on the determined hash value and a distribution function, as shown at 307 in FIG. 3B for example.

The packet handling classification of the packet flow could be based on one or more fields in the packet header, and the determined hash value could be based on the same one or more fields in the packet header.

For a packet flow and a corresponding return packet flow, a method could involve handling the packets in the packet flow by a first load balancer, and handling the packets in the corresponding return flow by a second load balancer. The first and second load balancers in this example, as above, could be considered a load balancer pair, with the first and second load balancers being configured to direct all of the packets in the packet flow and all of the packets in the corresponding return flow to the same service chain instance.

This type of handling by a load balancer pair could involve determining hash values based on contents of packet headers and a symmetric hash function, and determining service chain instances to which packets are to be directed based on the determined hash values. The symmetric hash function produces identical hash values for all of the packets in the packet flow and all of the packets in the corresponding return flow, to direct all of the packets in the packet flow and all of the packets in the corresponding return flow to the same one of the service chain instances.

The symmetric hash function could involve performing an XOR on packet source and destination addresses and determining the hash values based on a result of the XOR, to provide the same hash value for pairs of source and destination addresses.

Another example illustrated in FIG. 4 involves determining the hash values at 406 based on packet source and destination addresses and source and destination port numbers for the packets in one of the packet flow and the corresponding return flow, and determining the hash values for the packets in the other of the packet flow and the corresponding return flow based on transposed packet source and destination addresses and transposed source and destination port numbers that are transposed at 410, to provide the same hash value for pairs of source and destination addresses and source and destination port numbers.

In some embodiments, a method includes providing stateful load balancing between the service chain instances. Stateful load balancing involves keeping a flow record that is associated with the packet flow and that includes an identifier of the one of the service chain instances to which a packet is to be directed, and directing the packet and all other packets in the packet flow to the one of the service chain instances. The operations at 509 and 512 in FIG. 5 are examples of operations that could be involved in keeping a flow record and directing packets to a service chain instance.

More generally, stateful load balancing further involves directing a first packet in any packet flow to a service chain instance (NO at 503 and directing the packet at 512 in FIG. 5, for example), keeping a flow record that is associated with the packet flow and that includes an identifier of the service chain instance (509 in FIG. 5, for example), and directing all subsequent packets in the one packet flow to the service chain instance (YES at 503 and directing the packet at 512 in FIG. 5, for example).

The identifier could be or include a service chain index, in which case stateful load balancing could involve determining whether each received packet is from a packet flow for which a flow record associated with the packet flow includes a service chain instance index and, for each received packet from a packet flow for which a flow record associated with the packet flow includes a service chain instance index, directing the received packet to a service chain instance associated with the service chain instance index in the flow record.

Fate sharing between the packet flow and its corresponding return flow could be provided in some embodiments. Fate sharing involves removing the service chain instance on an indication that the service chain instance is no longer able to process either of the packet flow or the corresponding return flow.

In some embodiments, in the context of a load balancer pair, a method also includes communicating fate information, such as the link-down state referenced above, associated with one or both of the packet flow and the return packet flow between the first load balancer and the second load balancer.

Method embodiments could include other features, such as features disclosed herein with reference to a UCP or system. For example, one or more service chain instances could be virtualized service chain instances implemented using software for execution by general purpose computing hardware. A single implementation of the general purpose computing hardware could be configured to execute multiple virtualized service chain instances. The number of virtualized service chain instances could be adaptable, and accordingly a method could involve adapting a number of service chain instances of a service chain based on demand for the service chain.

Regarding direction of packets to service chain instances, the directing could involve directing packets to the service chain instances using tunnel identifiers, with each of the service chain instances being associated with a tunnel and a tunnel identifier.

A method could also or instead involve collecting statistics about packets and packet flows, and analyzing the packet flows based on the statistics collected by the flow cache.

In some embodiments, a method involves creating copies of selected received packets and outputting the copies of the selected packets. Further operations involving such copies of selected packets could include, for example, detecting intrusions based on the copies of the selected packets, and/or storing the copies of the selected packets. Intrusion detection or other operations could be performed on the fly, without necessarily storing the packet copies.

A method could include determining whether received packets conform to protocol specifications, and performing a non-conformance action on a non-conforming packet that does not conform to the protocol specifications. The non-conformance action could include one or more of: dropping the non-conforming packet, and sending the non-conforming packet for packet inspection.

One or both of packet filtering and packet marking based on packet properties could be provided in some embodiments. For example, a method could include filtering packets, marking packets, or both, based on membership in a predefined set.

According to embodiments disclosed herein, packets could be processed at a rate equal to or greater than a maximum transmission rate between the pair of network security zones.

Another embodiment consistent with the present disclosure relates to a non-transitory processor-readable storage medium storing instructions which, when executed by a processor, cause the processor to perform a method for handling packet flows between a pair of network security zones in a communications network. The method could involve receiving a packet that is sent from one of the network security zones toward the other of the network security zones, and directing the packet to a packet processing service chain based on a packet handling classification of a packet flow of which the packet is a part. The service chain has multiple identical service chain instances to perform a service on packets, and the directing involves directing the packet to one of the service chain instances within the service chain. Such a method could also involve transmitting a packet processed by any of the service chain instances to the other network security zone.

Other method features disclosed herein could be implemented in this manner, using a non-transitory processor-readable storage medium storing instructions for execution by a processor.

What has been described is merely illustrative of the application of principles of embodiments of the present disclosure. Other arrangements and methods can be implemented by those skilled in the art.

For example, the methods described herein and shown in the drawings are illustrative of embodiments. Other embodiments could include additional, fewer, and/or different operations, performed in a similar or different order.

Similarly, example systems or devices disclosed herein are also representative of embodiments, and other embodiments could include additional, fewer, and/or different components coupled together in a similar or different order.

Although described primarily in the context of methods and systems or devices, other embodiments could be implemented, including non-transitory processor-readable media for example.

We claim:

1. A system for handling packet flows between a pair of network security zones in a communications network, and protecting one of the network security zones from an attack originating in the other network security zone, the system comprising:
   a receiver to receive a packet flow that is sent from a first network security zone of the network security zones toward a second network security zone of the network security zones, wherein the packet flow is a group of data packets with a set of common characteristics, wherein the set of common characteristics includes at least Internet Protocol (IP) source and destination addresses and IP protocol;
   an enforcement module, coupled to the receiver, to direct all of the data packets of the packet flow to a network protection or packet inspection service chain based on a packet handling classification of the packet flow wherein the service chain has a plurality of identical service chain instances to perform a service on packets, wherein the enforcement module is configured to direct all of the data packets of the packet flow to one of the service chain instances within the service chain;
   a transmitter, coupled to the enforcement module, to transmit all of the data packets of the packet flow processed by the one of the service chain instances to the second network security zone,
   the enforcement module comprising a Field Programmable Gate Array,
   wherein the data packets of the packet flow traveling between the first security zone and the second security zone through the system do not require an address of the system for packet forwarding purposes,
   wherein the system is configured to enforce internally or externally derived security rules comprising redirecting the data packets of the packet flow, dropping the data packets of the packet flow, and rate limiting the data packets of the packet flow.

2. The system of claim 1, further comprising:
   a flow cache, coupled between the receiver and the enforcement module, to characterize a packet as part of the packet flow.

3. The system of claim 2, wherein the flow cache is configured to append to the packet a flow identifier to identify the packet flow of which the packet is a part, the flow identifier comprising a fingerprint that is generated based on one or more characteristics of the set of common characteristics of the packet flow.

4. The system of claim 2, further comprising:
   a memory, coupled to the flow cache, storing a flow database comprising packet fingerprint values and respective corresponding packet flow identifiers,
   wherein the flow cache is configured to characterize the packet as part of the packet flow by determining a fingerprint based on one or more characteristics of the set of common characteristics of the packet flow and querying the flow database for a packet fingerprint value matching the fingerprint determined for the packet.

5. The system of claim 4, wherein the flow cache is further configured to retrieve from the flow database the flow identifier corresponding to the packet fingerprint value matching the fingerprint determined for the packet where the flow database includes a packet fingerprint value matching the fingerprint.

6. The system of claim 4, wherein the flow cache is further configured to add to the flow database the fingerprint determined for the packet and a new flow identifier where the flow database does not include a packet fingerprint value matching the fingerprint.

7. The system of claim 1, further comprising:
   a classifier, coupled to the receiver, to classify the packet flow according to a set of one or more classification rules and determine the packet handling classification of the packet flow.

8. The system of claim 7, wherein the enforcement module comprises the classifier.

9. The system of claim 1, wherein the enforcement module comprises a load balancer to direct the packet flow to the one of the service chain instances and to balance loading of the plurality of service chain instances.

10. The system of claim 9, wherein the load balancer is configured to determine a hash value based on contents of a header of a packet of the packet flow, and to determine the one of the service chain instances based on the determined hash value and a distribution function.

11. The system of claim 10, wherein the packet handling classification of the packet flow is based on one or more fields in the packet header, wherein the determined hash value is based on the one or more fields in the packet header.

12. The system of claim 9, wherein the enforcement module comprises a plurality of load balancers, wherein the load balancer comprises a first load balancer of the plurality of load balancers, wherein packets in the packet flow are sent from a first host to a second host and are handled by the first load balancer, wherein packets in a corresponding return flow that are sent from the second host to the first host in response to the packet flow are handled by a second load balancer of the plurality of load balancers, the first and second load balancers comprising a load balancer pair, wherein the first and second load balancers are configured to direct all of the packets in the packet flow and all of the packets in the corresponding return flow to the one of the service chain instances.

13. The system of claim 12, wherein the first and second load balancers are configured to determine hash values based on contents of packet headers and a symmetric hash function, and to determine service chain instances to which packets are to be directed based on the determined hash values, wherein the symmetric hash function produces identical hash values for all of the packets in the packet flow and all of the packets in the corresponding return flow to direct all of the packets in the packet flow and all of the packets in the corresponding return flow to the one of the service chain instances.

14. The system of claim 13, wherein the symmetric hash function comprises performing an exclusive OR operation (XOR) on packet source and destination addresses and determining the hash values based on a result of the XOR, to provide the same hash value for pairs of source and destination addresses.

15. The system of claim 13, wherein the symmetric hash function comprises determining the hash values based on packet source and destination addresses and source and destination port numbers for the packets in one of the packet flow and the corresponding return flow, and determining the hash values for the packets in the other of the packet flow and the corresponding return flow based on transposed packet source and destination addresses and transposed source and destination port numbers, to provide the same hash value for pairs of source and destination addresses and source and destination port numbers.

16. The system of claim 1, wherein one or more of the plurality of service chain instances are virtualized service chain instances implemented using software for execution by general purpose computing hardware.

17. The system of claim 16, wherein a single implementation of the general purpose computing hardware is configured to execute multiple virtualized service chain instances of the plurality of service chain instances.

18. The system of claim 16, wherein a number of service chain instances in the one or more of the plurality of virtualized service chain instances is adaptable based on demand for the service chain.

19. The system of claim 16, wherein the enforcement module is configured to direct packet flows to the service chain instances using a tunnel identifier, wherein each of the service chain instances in the plurality of service chain instances is associated with a different tunnel and tunnel identifier.

20. The system of claim 1, wherein the enforcement module comprises a load balancer to direct all of the data packets of the packet flow to the one of the service chain instances and to provide stateful load balancing between the service chain instances, wherein the stateful load balancing comprises keeping a flow record that is associated with the packet flow and that includes an identifier of the one of the service chain instances, and directing all data packets in the packet flow to the one of the service chain instances.

21. The system of claim 20, wherein the stateful load balancing further comprises directing a first packet in any one packet flow to a service chain instance of the plurality of service chain instances, keeping a flow record that is associated with the one packet flow and that includes an identifier of the service chain instance of the plurality of service chain instances, and directing all subsequent packets in the one packet flow to the service chain instance of the plurality of service chain instances.

22. The system of claim 21, wherein the identifier comprises a service chain instance index, wherein the stateful load balancing comprises determining whether each received packet is from a packet flow for which a flow record associated with the packet flow includes a service chain instance index and, for each received packet from a packet flow for which a flow record associated with the packet flow includes a service chain instance index, directing the received packet to a service chain instance associated with the service chain instance index in the flow record.

23. The system of claim 1, wherein the enforcement module is further configured to provide fate sharing between the packet flow and a corresponding return flow, wherein packets in the packet flow are sent from a first host to a second host and are processed by a service chain instance, wherein packets in the corresponding return flow are sent from the second host to the first host in response to the packet flow and are processed by the service chain instance, wherein the fate sharing comprises removing the service chain instance on an indication that the service chain instance is no longer able to process either of the packet flow or the corresponding return flow.

24. The system of claim 23, wherein the enforcement module comprises a plurality of load balancers to balance loading of service chain instances, the load balancers comprising a first load balancer to handle the packets in the packet flow and a second load balancer to handle the packets in the corresponding return flow, the first and second load balancers comprising a load balancer pair, wherein the first load balancer and the second load balancer are configured to communicate fate information associated with one or both of the packet flow and the return packet flow.

25. The system of claim 1, further comprising:
   a flow cache, coupled between the receiver and the enforcement module, to collect statistics about packets and packet flows.

26. The system of claim 1, further comprising:
   a packet replicator, coupled between the receiver and the enforcement module, to create copies of selected received packets;
   a copy port, coupled to the packet replicator, to output the copies of the selected packets.

27. The system of claim 26, further comprising one or more of:
   an intrusion detection system, coupled to the copy port, to receive the copies of the selected packets and detect intrusions based on the copies of the selected packets;
   a storage medium, coupled to the copy port, to receive and store the copies of the selected packets.

28. The system of claim 1, further comprising:
   a protocol validator, coupled between the receiver and the enforcement module, to determine whether received packets conform to protocol specifications and to perform a non-conformance action on a non-conforming packet that does not conform to the protocol specifications.

29. The system of claim 28, wherein the non-conformance action comprises any one or more of:
   dropping the non-conforming packet;
   rate limiting the non-conforming packet;
   sending the non-conforming packet for packet inspection.

30. The system of claim 1, further comprising:
   a membership filter, coupled between the receiver and the enforcement module, to provide one or both of packet filtering and packet marking of packets in the packet flow wherein the filtering and marking is based on the set of common characteristics.

31. The system of claim 30, wherein the membership filter is configured to filter packets, mark packets, or both, based on membership in a predefined set.

32. The system of claim 1, configured to process packets at a rate equal to or greater than a maximum transmission rate between the pair of network security zones.

33. The system of claim 1, comprising one or more components configured for machine to machine communication with one or more components external to the system.

34. The system of claim 33,
wherein the one or more components comprise any of: a flow cache, a packet replicator, a protocol validator, a membership filter, and the enforcement module,
wherein the one or more components external to the system comprise any of: a flow analyzer, an intrusion detection system, and a service chain.

35. The system of claim 1, wherein the enforcement module is configured for machine to machine communication with one or more components external to the system.

36. The system of claim 2, wherein the flow cache is configured for machine to machine communication with one or more components external to the system.

37. The system of claim 25, further comprising:
a packet flow analyzer, coupled to the flow cache, to analyze the packet flows based on the statistics collected by the flow cache.

38. The system of claim 26, wherein the packet replicator is configured for machine to machine communication with one or more components external to the system.

39. The system of claim 27, wherein the intrusion detection system is further configured for machine to machine communication with one or more other components of the system.

40. The system of claim 28, wherein the protocol validator is configured for machine to machine communication with one or more components external to the system.

41. The system of claim 30, wherein the membership filter is configured for machine to machine communication with one or more components external to the system.

42. A method for handling packet flows between a pair of network security zones in a communications network, and protecting one of the network security zones from an attack originating in the other network security zone, the method comprising:
receiving a packet flow that is sent from a first network security zone of the network security zones toward a second network security zone of the network security zones, wherein the packet flow is a group of data packets with a set of common characteristics, wherein the set of common characteristics includes at least Internet Protocol (IP) source and destination addresses and IP protocol;
directing all of the data packets of the packet flow to a network protection or packet inspection service chain based on a packet handling classification of the packet flow, wherein the service chain has a plurality of identical service chain instances to perform a service on packets, wherein the directing further comprises directing all of the data packets of the packet flow to one of the service chain instances within the service chain;
transmitting all of the data packets of the packet flow processed by the one of the service chain instances to the second network security zone,
enforcing internally or externally derived security rules comprising redirecting the data packets of the packet flow, dropping the data packets of the packet flow, and rate limiting the data packets of the packet flow,
the directing being done by an enforcement module comprising a Field Programmable Gate Array,
wherein the data packets of the packet flow traveling between the first security zone and the second security zone through a system comprising the enforcement module do not require an address of the system for packet forwarding purposes.

43. The method of claim 42, further comprising:
characterizing a packet as part of the packet flow.

44. The method of claim 43, further comprising:
appending to the packet a flow identifier to identify the packet flow of which the packet is a part, the flow identifier comprising a fingerprint that is generated based on one or more characteristics of the set of common characteristics of the packet flow.

45. The method of claim 43, further comprising:
storing, in a memory, a flow database comprising packet fingerprint values and respective corresponding packet flow identifiers,
wherein the characterizing comprises determining a fingerprint based on one or more characteristics of the set of common characteristics of the packet flow and querying the flow database for a packet fingerprint value matching the fingerprint determined for the packet.

46. The method of claim 45, wherein the characterizing further comprises retrieving from the flow database the flow identifier corresponding to the packet fingerprint value matching the fingerprint determined for the packet where the flow database includes a packet fingerprint value matching the fingerprint.

47. The method of claim 45, wherein the characterizing further comprises adding to the flow database the fingerprint determined for the packet and a new flow identifier where the flow database does not include a packet fingerprint value matching the fingerprint.

48. The method of claim 42, further comprising:
classifying the packet flow according to a set of one or more classification rules to determine the packet handling classification of the packet flow.

49. The method of claim 42, further comprising:
load balancing of the plurality of service chain instances.

50. The method of claim 49, wherein the load balancing comprises determining a hash value based on contents of a header of a packet of the packet flow, and determining the one of the service chain instances based on the determined hash value and a distribution function.

51. The method of claim 50, wherein the packet handling classification of the packet flow is based on one or more fields in the packet header, wherein the determined hash value is based on the one or more fields in the packet header.

52. The method of claim 49, wherein packets in the packet flow are sent from a first host to a second host, wherein the load balancing comprises:
handling the packets in the packet flow by a first load balancer of a plurality of load balancers;
handling, by a second load balancer of the plurality of load balancers, packets in a corresponding return flow, that are sent from the second host to the first host in response to the packet flow,
wherein the first and second load balancers comprise a load balancer pair, wherein the first and second load balancers are configured to direct all of the packets in the packet flow and all of the packets in the corresponding return flow to the one of the service chain instances.

53. The method of claim 52, wherein the handling by the first and second load balancers comprise determining hash values based on contents of packet headers and a symmetric hash function, and determining service chain instances to which packets are to be directed based on the determined hash values, wherein the symmetric hash function produces identical hash values for all of the packets in the packet flow and all of the packets in the corresponding return flow to direct all of the packets in the packet flow and all of the packets in the corresponding return flow to the one of the service chain instances.

54. The method of claim 53, wherein the symmetric hash function comprises performing an exclusive OR operation (XOR) on packet source and destination addresses and determining the hash values based on a result of the XOR, to provide the same hash value for pairs of source and destination addresses.

55. The method of claim 53, wherein the symmetric hash function comprises determining the hash values based on packet source and destination addresses and source and destination port numbers for the packets in one of the packet flow and the corresponding return flow, and determining the hash values for the packets in the other of the packet flow and the corresponding return flow based on transposed packet source and destination addresses and transposed source and destination port numbers, to provide the same hash value for pairs of source and destination addresses and source and destination port numbers.

56. The method of claim 42, wherein one or more of the plurality of service chain instances are virtualized service chain instances implemented using software for execution by general purpose computing hardware.

57. The method of claim 56, wherein a single implementation of the general purpose computing hardware is configured to execute multiple service chain instances of the one or more of the plurality of virtualized service chain instances.

58. The method of claim 56, further comprising:
adapting a number of service chain instances in the one or more of the plurality of virtualized service chain instances based on demand for the service chain.

59. The method of claim 56, wherein the directing comprises directing packet flows to the service chain instances using tunnel identifiers, wherein each of the service chain instances in the plurality of service chain instances is associated with a tunnel and tunnel identifier.

60. The method of claim 42, further comprising:
providing stateful load balancing between the service chain instances, wherein the stateful load balancing comprises keeping a flow record that is associated with the packet flow and that includes an identifier of the one of the service chain instances, and directing all of the data packets in the packet flow to the one of the service chain instances.

61. The method of claim 60, wherein the stateful load balancing further comprises directing a first packet in any one packet flow to a service chain instance of the plurality of service chain instances, keeping a flow record that is associated with the one packet flow and that includes an identifier of the service chain instance of the plurality of service chain instances, and directing all subsequent packets in the one packet flow to the service chain instance of the plurality of service chain instances.

62. The method of claim 61, wherein the identifier comprises a service chain instance index, wherein the stateful load balancing comprises determining whether each received packet is from a packet flow for which a flow record associated with the packet flow includes a service chain instance index and, for each received packet from a packet flow for which a flow record associated with the packet flow includes a service chain instance index, directing the received packet to a service chain instance associated with the service chain instance index in the flow record.

63. The method of claim 42, further comprising:
providing fate sharing between the packet flow and a corresponding return flow, wherein packets in the packet flow are sent from a first host to a second host and are processed by a service chain instance, wherein packets in the corresponding return flow are sent from the second host to the first host in response to the packet flow and are processed by the service chain instance, wherein the fate sharing comprises removing the service chain instance on an indication that the service chain instance is no longer able to process either of the packet flow or the corresponding return flow.

64. The method of claim 63, further comprising:
load balancing of the plurality of service chain instances, wherein the load balancing comprises:
handling the packets in the packet flow by a first load balancer of a plurality of load balancers;
handling, by a second load balancer of the plurality of load balancers, packets in a corresponding return flow, that are sent from the second host to the first host in response to the packet flow,
wherein the first and second load balancers comprise a load balancer pair,
wherein the method further comprises communicating fate information associated with one or both of the packet flow and the return packet flow between the first load balancer and the second load balancer.

65. The method of claim 42, further comprising:
collecting statistics about packets and packet flows;
analyzing the packet flows based on the statistics collected by the flow cache.

66. The method of claim 42, further comprising:
creating copies of selected received packets;
outputting the copies of the selected packets.

67. The method of claim 66, further comprising one or more of:
detecting intrusions based on the copies of the selected packets;
storing the copies of the selected packets.

68. The method of claim 42, further comprising:
determining whether received packets conform to protocol specifications;
performing a non-conformance action on a non-conforming packet that does not conform to the protocol specifications.

69. The method of claim 68, wherein the non-conformance action comprises any one or more of:
dropping the non-conforming packet;
rate limiting the packet;
sending the non-conforming packet for packet inspection.

70. The method of claim 42, further comprising:
providing one or both of packet filtering and packet marking of packets in the packet flow based on the set of common characteristics.

71. The method of claim 42, further comprising:
filtering packets, marking packets, or both, based on membership in a predefined set.

72. The method of claim 42, wherein packets are processed at a rate equal to or greater than a maximum transmission rate between the pair of network security zones.

73. A non-transitory processor-readable storage medium storing instructions which, when executed by a processor, cause the processor to perform a method for handling packet flows between a pair of network security zones in a communications network and protecting one of the network security zones from an attack originating in the other network security zone, the method comprising:

receiving a packet flow that is sent from a first network security zone of the network security zones toward a second network security zone of the network security zones wherein the packet flow is a group of data packets with a set of common characteristics, wherein the set of common characteristics includes at least Internet Protocol (IP) source and destination addresses and IP protocol;

directing all of the data packets of the packet flow to a network protection or packet inspection service chain based on a packet handling classification of the packet flow, wherein the service chain has a plurality of identical service chain instances to perform a service on packets, wherein the directing further comprises directing all of the data packets of the packet flow to one of the service chain instances within the service chain;

transmitting all of the data packets of the packet flow processed by the one of the service chain instances to the second network security zone, enforcing internally or externally derived security rules comprising redirecting the data packets of the packet flow, dropping the data packets of the packet flow, and rate limiting the data packets of the packet flow, the directing being done by an enforcement module comprising a Field Programmable Gate Array, wherein the data packets of the packet flow traveling between the first security zone and the second security zone through a system comprising the enforcement module do not require an address of the system for packet forwarding purposes.

* * * * *